(12) United States Patent  
Moskowitz

(10) Patent No.: US 8,271,795 B2  
(45) Date of Patent: *Sep. 18, 2012

(54) SECURITY BASED ON SUBLIMINAL AND SUPRALIMINAL CHANNELS FOR DATA OBJECTS

(75) Inventor: Scott A. Moskowitz, Sunny Isles Beach, FL (US)

(73) Assignee: Blue Spike, Inc., Sunny Isles Beach, FL (US)

( * ) Notice: Subject to any disclaimer, the term of this patent is extended or adjusted under 35 U.S.C. 154(b) by 801 days.

This patent is subject to a terminal disclaimer.

(21) Appl. No.: 11/518,806

(22) Filed: Sep. 11, 2006

(65) Prior Publication Data

US 2008/0028222 A1    Jan. 31, 2008

Related U.S. Application Data

(62) Division of application No. 09/956,262, filed on Sep. 20, 2001, now Pat. No. 7,127,615.

(60) Provisional application No. 60/234,199, filed on Sep. 20, 2000.

(51) Int. Cl.  
*H04L 9/32* (2006.01)

(52) U.S. Cl. .................................................... 713/179

(58) Field of Classification Search .................. 713/179  
See application file for complete search history.

(56) References Cited

U.S. PATENT DOCUMENTS

| | | |
|---|---|---|
| 3,947,825 A | 3/1976 | Cassada |
| 3,984,624 A | 10/1976 | Waggener |
| 3,986,624 A | 10/1976 | Cates, Jr. et al. |
| 4,038,596 A | 7/1977 | Lee |
| 4,200,770 A | 4/1980 | Hellman et al. |
| 4,218,582 A | 8/1980 | Hellman et al. |
| 4,339,134 A | 7/1982 | Macheel |
| 4,390,898 A | 6/1983 | Bond et al. |
| 4,405,829 A | 9/1983 | Rivest et al. |
| 4,424,414 A | 1/1984 | Hellman et al. |
| 4,528,588 A | 7/1985 | Lofberg |
| 4,672,605 A | 6/1987 | Hustig et al. |

(Continued)

FOREIGN PATENT DOCUMENTS

EP    0372601    6/1990

(Continued)

OTHER PUBLICATIONS

European Search Report & European Search Opinion, completed Oct. 15, 2007; authorized officer James Hazel (EP 07 11 2420) (9 pages).

(Continued)

*Primary Examiner* — Jacob Lipman  
(74) *Attorney, Agent, or Firm* — Neifeld IP Law, PC

(57) ABSTRACT

This invention relates to security for data objects; more particularly, the present invention relates to improved security based on subliminal and supraliminal channels for data objects. In another embodiment, a method of protecting a data object comprises: steganographically encoding a subset of candidate bits in a digitized sample stream; perceptibly manipulating data in the digitized sample stream; and combining the imperceptible and perceptible data changes to create a secure/unique digital sample stream. In yet another embodiment, a method for securing a data signal comprises: preanalyzing said data signal for candidate watermark/signature bits; steganographically encoding independent data into the data signal into a subset of the candidate watermark bits, at least one time; and encoding the data signal subsequently with a perceptible technique.

13 Claims, 4 Drawing Sheets

SYNCHRONIZER

U.S. PATENT DOCUMENTS

| | | | |
|---|---|---|---|
| 4,748,668 A | 5/1988 | Shamir et al. | |
| 4,789,928 A | 12/1988 | Fujisaki | |
| 4,827,508 A | 5/1989 | Shear | |
| 4,876,617 A | 10/1989 | Best et al. | |
| 4,896,275 A | 1/1990 | Jackson | |
| 4,908,873 A | 3/1990 | Philibert et al. | |
| 4,939,515 A | 7/1990 | Adelson | |
| 4,969,204 A | 11/1990 | Jones et al. | |
| 4,972,471 A | 11/1990 | Gross et al. | |
| 4,977,594 A | 12/1990 | Shear | |
| 4,979,210 A | 12/1990 | Nagata et al. | |
| 4,980,782 A | 12/1990 | Ginkel | |
| 5,050,213 A | 9/1991 | Shear | |
| 5,073,925 A | 12/1991 | Nagata et al. | |
| 5,077,665 A | 12/1991 | Silverman et al. | |
| 5,113,437 A | 5/1992 | Best et al. | |
| 5,136,581 A | 8/1992 | Muehrcke | |
| 5,136,646 A | 8/1992 | Haber et al. | |
| 5,136,647 A | 8/1992 | Haber et al. | |
| 5,142,576 A | 8/1992 | Nadan | |
| 5,161,210 A | 11/1992 | Druyvesteyn et al. | |
| 5,210,820 A | 5/1993 | Kenyon | |
| 5,243,423 A | 9/1993 | DeJean et al. | |
| 5,243,515 A | 9/1993 | Lee | |
| 5,287,407 A | 2/1994 | Holmes | |
| 5,319,735 A | 6/1994 | Preuss et al. | |
| 5,341,429 A | 8/1994 | Stringer et al. | |
| 5,341,477 A | 8/1994 | Pitkin et al. | |
| 5,363,448 A | 11/1994 | Koopman et al. | |
| 5,365,586 A | 11/1994 | Indeck et al. | |
| 5,369,707 A | 11/1994 | Follendore, III | |
| 5,379,345 A | 1/1995 | Greenberg | |
| 5,394,324 A | 2/1995 | Clearwater | |
| 5,398,285 A | 3/1995 | Borgelt et al. | |
| 5,406,627 A | 4/1995 | Thompson et al. | |
| 5,408,505 A | 4/1995 | Indeck et al. | |
| 5,410,598 A | 4/1995 | Shear | |
| 5,412,718 A | 5/1995 | Narasimhalu et al. | |
| 5,418,713 A | 5/1995 | Allen | |
| 5,428,606 A | 6/1995 | Moskowitz | |
| 5,450,490 A | 9/1995 | Jensen et al. | |
| 5,469,536 A | 11/1995 | Blank | |
| 5,471,533 A | 11/1995 | Wang et al. | |
| 5,478,990 A | 12/1995 | Montanari et al. | |
| 5,479,210 A | 12/1995 | Cawley et al. | |
| 5,487,168 A | 1/1996 | Geiner et al. | |
| 5,493,677 A | 2/1996 | Balogh et al. | |
| 5,497,419 A | 3/1996 | Hill | |
| 5,506,795 A | 4/1996 | Yamakawa | |
| 5,513,126 A | 4/1996 | Harkins et al. | |
| 5,513,261 A | 4/1996 | Maher | |
| 5,530,739 A | 6/1996 | Okada | |
| 5,530,751 A | 6/1996 | Morris | |
| 5,530,759 A | 6/1996 | Braudaway et al. | |
| 5,539,735 A | 7/1996 | Moskowitz | |
| 5,548,579 A | 8/1996 | Lebrun et al. | |
| 5,568,570 A | 10/1996 | Rabbani | |
| 5,579,124 A | 11/1996 | Aijala et al. | |
| 5,581,703 A | 12/1996 | Baugher et al. | |
| 5,583,488 A | 12/1996 | Sala et al. | |
| 5,598,470 A | 1/1997 | Cooper et al. | |
| 5,606,609 A | 2/1997 | Houser et al. | |
| 5,613,004 A | 3/1997 | Cooperman et al. | |
| 5,617,119 A | 4/1997 | Briggs et al. | |
| 5,625,690 A | 4/1997 | Michel et al. | |
| 5,629,980 A | 5/1997 | Stefik et al. | |
| 5,633,932 A | 5/1997 | Davis et al. | |
| 5,634,040 A | 5/1997 | Her et al. | |
| 5,636,276 A | 6/1997 | Brugger | |
| 5,636,292 A | 6/1997 | Rhoads | |
| 5,640,569 A | 6/1997 | Miller et al. | |
| 5,646,997 A | 7/1997 | Barton | |
| 5,657,461 A | 8/1997 | Harkins et al. | |
| 5,659,726 A | 8/1997 | Sandford, II et al. | |
| 5,664,018 A | 9/1997 | Leighton | |
| 5,673,316 A | 9/1997 | Auerbach et al. | |
| 5,677,952 A | 10/1997 | Blakley et al. | |
| 5,680,462 A | 10/1997 | Miller et al. | |
| 5,687,236 A | 11/1997 | Moskowitz et al. | |
| 5,689,587 A | 11/1997 | Bender et al. | |
| 5,696,828 A | 12/1997 | Koopman, Jr. | |
| 5,719,937 A | 2/1998 | Warren et al. | |
| 5,721,788 A | 2/1998 | Powell et al. | |
| 5,734,752 A | 3/1998 | Knox | |
| 5,737,416 A | 4/1998 | Cooper et al. | |
| 5,737,733 A | 4/1998 | Eller | |
| 5,740,244 A | 4/1998 | Indeck et al. | |
| 5,745,569 A | 4/1998 | Moskowitz et al. | |
| 5,748,783 A | 5/1998 | Rhoads | |
| 5,751,811 A | 5/1998 | Magnotti et al. | |
| 5,754,697 A | 5/1998 | Fu et al. | |
| 5,757,923 A | 5/1998 | Koopman, Jr. | |
| 5,765,152 A | 6/1998 | Erickson | |
| 5,768,396 A | 6/1998 | Sone | |
| 5,774,452 A | 6/1998 | Wolosewicz | |
| 5,790,677 A | 8/1998 | Fox et al. | |
| 5,799,083 A | 8/1998 | Brothers et al. | |
| 5,809,139 A | 9/1998 | Girod et al. | |
| 5,809,160 A | 9/1998 | Powell et al. | |
| 5,818,818 A | 10/1998 | Soumiya | |
| 5,822,432 A | 10/1998 | Moskowitz et al. | |
| 5,828,325 A | 10/1998 | Wolosewicz et al. | |
| 5,832,119 A | 11/1998 | Rhoads | |
| 5,842,213 A | 11/1998 | Odom | |
| 5,848,155 A | 12/1998 | Cox | |
| 5,850,481 A | 12/1998 | Rhoads | |
| 5,859,920 A | 1/1999 | Daly et al. | |
| 5,860,099 A | 1/1999 | Milios et al. | |
| 5,862,260 A | 1/1999 | Rhoads | |
| 5,870,474 A | 2/1999 | Wasilewski et al. | |
| 5,884,033 A | 3/1999 | Duvall et al. | |
| 5,889,868 A | 3/1999 | Moskowitz et al. | |
| 5,893,067 A | 4/1999 | Bender et al. | |
| 5,894,521 A | 4/1999 | Conley | |
| 5,903,721 A | 5/1999 | Sixtus | |
| 5,905,800 A | 5/1999 | Moskowitz et al. | |
| 5,905,975 A | 5/1999 | Ausubel | |
| 5,912,972 A | 6/1999 | Barton | |
| 5,915,027 A | 6/1999 | Cox et al. | |
| 5,917,915 A | 6/1999 | Hirose | |
| 5,918,223 A | 6/1999 | Blum | |
| 5,920,900 A | 7/1999 | Poole et al. | |
| 5,923,763 A | 7/1999 | Walker et al. | |
| 5,930,369 A | 7/1999 | Cox et al. | |
| 5,930,377 A | 7/1999 | Powell et al. | |
| 5,940,134 A | 8/1999 | Wirtz | |
| 5,943,422 A | 8/1999 | Van Wie et al. | |
| 5,949,055 A | 9/1999 | Fleet | |
| 5,963,909 A | 10/1999 | Warren et al. | |
| 5,973,731 A | 10/1999 | Schwab | |
| 5,974,141 A | 10/1999 | Saito | |
| 5,991,426 A | 11/1999 | Cox et al. | |
| 5,999,217 A | 12/1999 | Berners-Lee | |
| 6,009,176 A | 12/1999 | Gennaro et al. | |
| 6,029,126 A | 2/2000 | Malvar | |
| 6,041,316 A | 3/2000 | Allen | |
| 6,044,471 A | 3/2000 | Colvin | |
| 6,049,838 A | 4/2000 | Miller et al. | |
| 6,051,029 A | 4/2000 | Paterson et al. | |
| 6,061,793 A * | 5/2000 | Tewfik et al. | 713/176 |
| 6,067,622 A | 5/2000 | Moore | |
| 6,069,914 A | 5/2000 | Cox | |
| 6,078,664 A | 6/2000 | Moskowitz et al. | |
| 6,081,251 A | 6/2000 | Sakai et al. | |
| 6,081,587 A | 6/2000 | Reyes et al. | |
| 6,081,597 A | 6/2000 | Hoffstein | |
| 6,088,455 A | 7/2000 | Logan et al. | |
| 6,131,162 A | 10/2000 | Yoshiura et al. | |
| 6,141,753 A | 10/2000 | Zhao et al. | |
| 6,141,754 A | 10/2000 | Choy | |
| 6,148,333 A | 11/2000 | Guedalia | |
| 6,154,571 A | 11/2000 | Cox et al. | |
| 6,192,138 B1 | 2/2001 | Yamadaji | |
| 6,199,058 B1 | 3/2001 | Wong et al. | |
| 6,205,249 B1 | 3/2001 | Moskowitz | |
| 6,208,745 B1 | 3/2001 | Florencio et al. | |
| 6,226,618 B1 | 5/2001 | Downs | |

| | | |
|---|---|---|
| 6,230,268 B1 | 5/2001 | Miwa et al. |
| 6,233,347 B1 | 5/2001 | Chen et al. |
| 6,233,684 B1 | 5/2001 | Stefik et al. |
| 6,240,121 B1 | 5/2001 | Senoh |
| 6,263,313 B1 | 7/2001 | Milsted et al. |
| 6,272,634 B1 | 8/2001 | Tewfik et al. |
| 6,275,988 B1 | 8/2001 | Nagashima et al. |
| 6,278,780 B1 | 8/2001 | Shimada |
| 6,278,791 B1 | 8/2001 | Honsinger et al. |
| 6,282,300 B1 | 8/2001 | Bloom et al. |
| 6,282,650 B1 | 8/2001 | Davis |
| 6,285,775 B1 | 9/2001 | Wu et al. |
| 6,301,663 B1 | 10/2001 | Kato et al. |
| 6,310,962 B1 | 10/2001 | Chung et al. |
| 6,330,335 B1 | 12/2001 | Rhoads |
| 6,330,672 B1 | 12/2001 | Shur |
| 6,345,100 B1 | 2/2002 | Levine |
| 6,351,765 B1 | 2/2002 | Pietropaolo et al. |
| 6,363,483 B1 | 3/2002 | Keshav |
| 6,373,892 B1 | 4/2002 | Ichien et al. |
| 6,373,960 B1 | 4/2002 | Conover et al. |
| 6,374,036 B1 * | 4/2002 | Ryan et al. ............ 386/94 |
| 6,377,625 B1 | 4/2002 | Kim |
| 6,381,618 B1 | 4/2002 | Jones et al. |
| 6,381,747 B1 | 4/2002 | Wonfor et al. |
| 6,385,324 B1 | 5/2002 | Koppen |
| 6,385,329 B1 | 5/2002 | Sharma et al. |
| 6,385,596 B1 | 5/2002 | Wiser |
| 6,389,538 B1 | 5/2002 | Gruse et al. |
| 6,405,203 B1 | 6/2002 | Collart |
| 6,415,041 B1 | 7/2002 | Oami et al. |
| 6,418,421 B1 | 7/2002 | Hurtado |
| 6,425,081 B1 | 7/2002 | Iwamura |
| 6,430,301 B1 | 8/2002 | Petrovic |
| 6,430,302 B2 | 8/2002 | Rhoads |
| 6,442,283 B1 | 8/2002 | Tewfik et al. |
| 6,446,211 B1 | 9/2002 | Colvin |
| 6,453,252 B1 | 9/2002 | Laroche |
| 6,457,058 B1 | 9/2002 | Ullum et al. |
| 6,463,468 B1 | 10/2002 | Buch et al. |
| 6,484,264 B1 | 11/2002 | Colvin |
| 6,493,457 B1 | 12/2002 | Quackenbush |
| 6,502,195 B1 | 12/2002 | Colvin |
| 6,522,767 B1 | 2/2003 | Moskowitz et al. |
| 6,522,769 B1 | 2/2003 | Rhoads et al. |
| 6,523,113 B1 | 2/2003 | Wehrenberg |
| 6,530,021 B1 | 3/2003 | Epstein et al. |
| 6,532,284 B2 | 3/2003 | Walker et al. |
| 6,539,475 B1 | 3/2003 | Cox et al. |
| 6,557,103 B1 | 4/2003 | Boncelet, Jr. et al. |
| 6,584,125 B1 | 6/2003 | Katto |
| 6,587,837 B1 | 7/2003 | Spagna et al. |
| 6,590,996 B1 | 7/2003 | Reed |
| 6,598,162 B1 | 7/2003 | Moskowitz |
| 6,606,393 B1 | 8/2003 | Xie et al. |
| 6,611,599 B2 | 8/2003 | Natarajan |
| 6,647,424 B1 | 11/2003 | Pearson et al. |
| 6,658,010 B1 | 12/2003 | Enns et al. |
| 6,665,489 B2 | 12/2003 | Collart |
| 6,668,246 B1 | 12/2003 | Yeung et al. |
| 6,668,325 B1 | 12/2003 | Collberg et al. |
| 6,674,858 B1 | 1/2004 | Kimura |
| 6,687,683 B1 | 2/2004 | Harada et al. |
| 6,725,372 B1 | 4/2004 | Lewis et al. |
| 6,754,822 B1 | 6/2004 | Zhao |
| 6,775,772 B1 | 8/2004 | Binding et al. |
| 6,784,354 B1 | 8/2004 | Lu et al. |
| 6,785,815 B1 | 8/2004 | Serret-Avila et al. |
| 6,785,825 B2 | 8/2004 | Colvin |
| 6,792,548 B2 | 9/2004 | Colvin |
| 6,792,549 B2 | 9/2004 | Colvin |
| 6,795,925 B2 | 9/2004 | Colvin |
| 6,799,277 B2 | 9/2004 | Colvin |
| 6,813,717 B2 | 11/2004 | Colvin |
| 6,813,718 B2 | 11/2004 | Colvin |
| 6,823,455 B1 | 11/2004 | Macy et al. |
| 6,834,308 B1 | 12/2004 | Ikezoye et al. |
| 6,842,862 B2 | 1/2005 | Chow et al. |
| 6,853,726 B1 | 2/2005 | Moskowitz et al. |
| 6,857,078 B2 | 2/2005 | Colvin |
| 6,865,747 B1 | 3/2005 | Mercier |
| 6,931,534 B1 | 8/2005 | Jandel et al. |
| 6,957,330 B1 | 10/2005 | Hughes |
| 6,966,002 B1 | 11/2005 | Torrubia-Saez |
| 6,968,337 B2 | 11/2005 | Wold |
| 6,977,894 B1 | 12/2005 | Achilles et al. |
| 6,978,370 B1 | 12/2005 | Kocher |
| 6,986,063 B2 | 1/2006 | Colvin |
| 6,990,453 B2 | 1/2006 | Wang |
| 7,007,166 B1 | 2/2006 | Moskowitz et al. |
| 7,020,285 B1 | 3/2006 | Kirovski et al. |
| 7,035,049 B2 | 4/2006 | Yamamoto |
| 7,035,409 B1 | 4/2006 | Moskowitz |
| 7,043,050 B2 | 5/2006 | Yuval |
| 7,046,808 B1 | 5/2006 | Metois et al. |
| 7,050,396 B1 | 5/2006 | Cohen et al. |
| 7,051,208 B2 | 5/2006 | Venkatesan et al. |
| 7,058,570 B1 | 6/2006 | Yu et al. |
| 7,093,295 B1 | 8/2006 | Saito |
| 7,095,874 B2 | 8/2006 | Moskowitz et al. |
| 7,103,184 B2 | 9/2006 | Jian |
| 7,107,451 B2 | 9/2006 | Moskowitz |
| 7,123,718 B1 | 10/2006 | Moskowitz et al. |
| 7,127,615 B2 | 10/2006 | Moskowitz |
| 7,150,003 B2 | 12/2006 | Naumovich et al. |
| 7,152,162 B2 | 12/2006 | Moskowitz et al. |
| 7,159,116 B2 | 1/2007 | Moskowitz |
| 7,162,642 B2 | 1/2007 | Schumann et al. |
| 7,177,429 B2 | 2/2007 | Moskowitz et al. |
| 7,177,430 B2 | 2/2007 | Kim |
| 7,206,649 B2 | 4/2007 | Kirovski et al. |
| 7,231,524 B2 | 6/2007 | Burns |
| 7,233,669 B2 | 6/2007 | Candelore |
| 7,240,210 B2 | 7/2007 | Michak et al. |
| 7,266,697 B2 | 9/2007 | Kirovski et al. |
| 7,286,451 B2 | 10/2007 | Wirtz |
| 7,287,275 B2 | 10/2007 | Moskowitz |
| 7,289,643 B2 | 10/2007 | Brunk et al. |
| 7,343,492 B2 | 3/2008 | Moskowitz et al. |
| 7,346,472 B1 | 3/2008 | Moskowitz et al. |
| 7,362,775 B1 | 4/2008 | Moskowitz |
| 7,363,278 B2 | 4/2008 | Schmelzer et al. |
| 7,409,073 B2 | 8/2008 | Moskowitz et al. |
| 7,457,962 B2 * | 11/2008 | Moskowitz ............ 713/176 |
| 7,460,994 B2 | 12/2008 | Herre et al. |
| 7,475,246 B1 | 1/2009 | Moskowitz |
| 7,530,102 B2 | 5/2009 | Moskowitz |
| 7,532,725 B2 | 5/2009 | Moskowitz et al. |
| 7,568,100 B1 | 7/2009 | Moskowitz et al. |
| 7,647,502 B2 | 1/2010 | Moskowitz |
| 7,647,503 B2 | 1/2010 | Moskowitz |
| 7,660,700 B2 | 2/2010 | Moskowitz et al. |
| 7,664,263 B2 | 2/2010 | Moskowitz |
| 7,664,264 B2 | 2/2010 | Moskowitz et al. |
| 7,664,958 B2 | 2/2010 | Moskowitz |
| 7,743,001 B1 | 6/2010 | Vermeulen |
| 7,761,712 B2 | 7/2010 | Moskowitz |
| 7,779,261 B2 | 8/2010 | Moskowitz |
| 2001/0010078 A1 | 7/2001 | Moskowitz |
| 2001/0029580 A1 | 10/2001 | Moskowitz |
| 2001/0043594 A1 | 11/2001 | Ogawa et al. |
| 2002/0009208 A1 | 1/2002 | Alattar |
| 2002/0010684 A1 | 1/2002 | Moskowitz |
| 2002/0026343 A1 | 2/2002 | Duenke |
| 2002/0047873 A1 | 4/2002 | Imanaka et al. |
| 2002/0056041 A1 | 5/2002 | Moskowitz |
| 2002/0071556 A1 | 6/2002 | Moskowitz et al. |
| 2002/0073043 A1 | 6/2002 | Herman et al. |
| 2002/0097873 A1 | 7/2002 | Petrovic |
| 2002/0103883 A1 | 8/2002 | Haverstock et al. |
| 2002/0161741 A1 | 10/2002 | Wang et al. |
| 2003/0002862 A1 | 1/2003 | Rodriguez |
| 2003/0126445 A1 | 7/2003 | Wehrenberg |
| 2003/0133702 A1 | 7/2003 | Collart |
| 2003/0200439 A1 | 10/2003 | Moskowitz |
| 2003/0219143 A1 | 11/2003 | Moskowitz et al. |
| 2004/0028222 A1 | 2/2004 | Sewell et al. |
| 2004/0037449 A1 | 2/2004 | Davis et al. |

| | | | |
|---|---|---|---|
| 2004/0049695 A1 | 3/2004 | Choi et al. | |
| 2004/0059918 A1 | 3/2004 | Xu | |
| 2004/0083369 A1 | 4/2004 | Erlingsson et al. | |
| 2004/0086119 A1 | 5/2004 | Moskowitz | |
| 2004/0093521 A1 | 5/2004 | Hamadeh et al. | |
| 2004/0117628 A1 | 6/2004 | Colvin | |
| 2004/0117664 A1 | 6/2004 | Colvin | |
| 2004/0125983 A1 | 7/2004 | Reed et al. | |
| 2004/0128514 A1 | 7/2004 | Rhoads | |
| 2004/0225894 A1 | 11/2004 | Colvin | |
| 2004/0243540 A1 | 12/2004 | Moskowitz et al. | |
| 2005/0135615 A1 | 6/2005 | Moskowitz et al. | |
| 2005/0160271 A9 | 7/2005 | Brundage et al. | |
| 2005/0177727 A1 | 8/2005 | Moskowitz et al. | |
| 2005/0246554 A1 | 11/2005 | Batson | |
| 2006/0005029 A1 | 1/2006 | Petrovic et al. | |
| 2006/0013395 A1 | 1/2006 | Brundage et al. | |
| 2006/0013451 A1 | 1/2006 | Haitsma | |
| 2006/0041753 A1 | 2/2006 | Haitsma | |
| 2006/0101269 A1 | 5/2006 | Moskowitz et al. | |
| 2006/0140403 A1 | 6/2006 | Moskowitz | |
| 2006/0251291 A1 | 11/2006 | Rhoads | |
| 2006/0285722 A1 | 12/2006 | Moskowitz et al. | |
| 2007/0011458 A1 | 1/2007 | Moskowitz | |
| 2007/0028113 A1 | 2/2007 | Moskowitz | |
| 2007/0064940 A1 | 3/2007 | Moskowitz et al. | |
| 2007/0079131 A1 | 4/2007 | Moskowitz et al. | |
| 2007/0083467 A1 | 4/2007 | Lindahl et al. | |
| 2007/0110240 A1 | 5/2007 | Moskowitz et al. | |
| 2007/0113094 A1 | 5/2007 | Moskowitz et al. | |
| 2007/0127717 A1 | 6/2007 | Herre et al. | |
| 2007/0226506 A1 | 9/2007 | Moskowitz | |
| 2007/0253594 A1 | 11/2007 | Lu et al. | |
| 2007/0294536 A1 | 12/2007 | Moskowitz et al. | |
| 2007/0300072 A1 | 12/2007 | Moskowitz | |
| 2007/0300073 A1 | 12/2007 | Moskowitz | |
| 2008/0005571 A1 | 1/2008 | Moskowitz | |
| 2008/0005572 A1 | 1/2008 | Moskowitz | |
| 2008/0016365 A1 | 1/2008 | Moskowitz | |
| 2008/0022113 A1 | 1/2008 | Moskowitz | |
| 2008/0022114 A1 | 1/2008 | Moskowitz | |
| 2008/0028222 A1 | 1/2008 | Moskowitz | |
| 2008/0046742 A1 | 2/2008 | Moskowitz | |
| 2008/0075277 A1 | 3/2008 | Moskowitz et al. | |
| 2008/0109417 A1 | 5/2008 | Moskowitz | |
| 2008/0133927 A1 | 6/2008 | Moskowitz et al. | |
| 2008/0151934 A1 | 6/2008 | Moskowitz et al. | |
| 2009/0037740 A1 | 2/2009 | Moskowitz | |
| 2009/0089427 A1 | 4/2009 | Moskowitz et al. | |
| 2009/0190754 A1 | 7/2009 | Moskowitz et al. | |
| 2009/0210711 A1 | 8/2009 | Moskowitz | |
| 2009/0220074 A1 | 9/2009 | Moskowitz et al. | |
| 2010/0002904 A1 | 1/2010 | Moskowitz | |
| 2010/0005308 A1 | 1/2010 | Moskowitz | |
| 2010/0064140 A1 | 3/2010 | Moskowitz | |
| 2010/0077219 A1 | 3/2010 | Moskowitz | |
| 2010/0077220 A1 | 3/2010 | Moskowitz | |
| 2010/0098251 A1 | 4/2010 | Moskowitz | |
| 2010/0106736 A1 | 4/2010 | Moskowitz | |
| 2010/0153734 A1 | 6/2010 | Moskowitz | |
| 2010/0182570 A1 | 7/2010 | Matsumoto et al. | |
| 2010/0202607 A1 | 8/2010 | Moskowitz | |
| 2010/0220861 A1 | 9/2010 | Moskowitz | |

FOREIGN PATENT DOCUMENTS

| | | |
|---|---|---|
| EP | 0372601 A1 | 6/1990 |
| EP | 0565947 | 10/1993 |
| EP | 0565947 A1 | 10/1993 |
| EP | 0581317 | 2/1994 |
| EP | 0581317 A2 | 2/1994 |
| EP | 0649261 | 4/1995 |
| EP | 0651554 | 5/1995 |
| EP | 0651554 A | 5/1995 |
| EP | 0872073 | 7/1996 |
| EP | 1547337 | 3/2006 |
| EP | 1354276 | 12/2007 |
| EP | 1354276 B1 | 12/2007 |
| NL | 100523 | 9/1998 |
| NL | 1005523 | 9/1998 |
| WO | WO 95/14289 | 5/1995 |
| WO | WO 9514289 | 5/1995 |
| WO | WO9701892 | 6/1995 |
| WO | WO 96/29795 | 9/1996 |
| WO | WO 9629795 | 9/1996 |
| WO | WO 9642151 | 12/1996 |
| WO | WO9726733 | 1/1997 |
| WO | WO 97/24833 | 7/1997 |
| WO | WO 9724833 | 7/1997 |
| WO | WO9726732 | 7/1997 |
| WO | WO9802864 | 7/1997 |
| WO | WO 9744736 | 11/1997 |
| WO | WO9802864 | 1/1998 |
| WO | WO98/37513 | 8/1998 |
| WO | WO9837513 | 8/1998 |
| WO | WO 9952271 | 10/1999 |
| WO | WO 99/62044 | 12/1999 |
| WO | WO 9962044 | 12/1999 |
| WO | WO 9963443 | 12/1999 |
| WO | WO 0057643 | 9/2000 |
| WO | WO0118628 | 3/2001 |
| WO | WO0143026 | 6/2001 |
| WO | WO0203385 | 1/2002 |
| WO | WO02003385 A1 | 10/2002 |

OTHER PUBLICATIONS

Arctic Monkeys (Whatever People Say I Am, That's What I'm Not), Domino Recording Co. Ltd., Pre-Release CD image, 2005, 1 page.

Radiohead ("Hail to the Thief"), EMI Music Group—Capitol, Pre-Release CD image, 2003, 1 page.

U.S. Appl. No. 08/999,766, filed Jul. 23, 1997, entitled "Steganographic Method and Device".

EPO Application No. 96919405.9, entitled "Steganographic Method and Device".

U.S. Appl. No. 11/050,779, filed Feb. 7, 2005, entitled "Steganographic Method and Device".

U.S. Appl. No. 08/674,726, filed Jul. 2, 1996, entitled "Exchange Mechanisms for Digital Information Packages with Bandwidth Securitization, Multichannel Digital Watermarks, and Key Management".

U.S. Appl. No. 09/545,589, filed Apr. 7, 2000, entitled "Method and System for Digital Watermarking".

U.S. Appl. No. 11/244,213, filed Oct. 5, 2005, entitled "Method and System for Digital Watermarking".

U.S. Appl. No. 11/649,026, filed Jan. 3, 2007, entitled "Method and System for Digital Watermarking".

U.S. Appl. No. 09/046,627, filed Mar. 24, 1998, entitled "Method for Combining Transfer Function with Predetermined Key Creation".

U.S. Appl. No. 10/602,777, filed Jun. 25, 2003, entitled "Method for Combining Transfer Function with Predetermined Key Creation".

U.S. Appl. No. 09/053,628, filed Apr. 2, 1998, entitled "Multiple Transform Utilization and Application for Secure Digital Watermarking".

U.S. Appl. No. 09/644,098, filed Aug. 23, 2000, entitled "Multiple Transform Utilization and Application for Secure Digital Watermarking".

Jap. App. No. 2000-542907, entitled "Multiple Transform Utilization and Application for Secure Digital Watermarking".

U.S. Appl. No. 09/767,733, filed Jan. 24, 2001, entitled "Multiple Transform Utilization and Application for Secure Digital Watermarking".

U.S. Appl. No. 11/358,874, filed Feb. 21, 2006, entitled "Multiple Transform Utilization and Application for Secure Digital Watermarking".

U.S. Appl. No. 10/417,231, filed Apr. 17, 2003, entitled "Methods, Systems and Devices for Packet Watermarking and Efficient Provisioning of Bandwidth".

U.S. Appl. No. 09/789,711, filed Feb. 22, 2001, entitled "Optimization Methods for the Insertion, Protection, and Detection of Digital Watermarks in Digital Data".

U.S. Appl. No. 11/497,822, filed Aug. 2, 2006, entitled "Optimization Methods for the Insertion, Protection, and Detection of Digital Watermarks in Digital Data".

U.S. Appl. No. 11/599,964, filed Nov. 15, 2006, entitled "Optimization Methods for the Insertion, Protection, and Detection of Digital Watermarks in Digital Data".
U.S. Appl. No. 11/599,838, filed Nov. 15, 2006, entitled "Optimization Methods for the Insertion, Protection, and Detection of Digital Watermarks in Digital Data".
U.S. Appl. No. 10/369,344, filed Feb. 18, 2003, entitled "Optimization Methods for the Insertion, Protection, and Detection of Digital Watermarks in Digitized Data".
U.S. Appl. No. 11/482,654, filed Jul. 7, 2006, entitled "Optimization Methods for the Insertion, Protection, and Detection of Digital Watermarks in Digitized Data".
U.S. Appl. No. 09/594,719, filed Jun. 16, 2000, entitled "Utilizing Data Reduction in Steganographic and Cryptographic Systems".
U.S. Appl. No. 11/519,467, filed Sep. 12, 2006, entitled "Utilizing Data Reduction in Steganographic and Cryptographic Systems".
U.S. Appl. No. 09/731,040, filed Dec. 7, 2000, entitled "Systems, Methods and Devices for Trusted Transactions".
U.S. Appl. No. 11/512,701, filed Aug. 29, 2006, entitled "Systems, Methods and Devices for Trusted Transactions".
U.S. Appl. No. 10/049,101, filed Feb. 8, 2002, entitled "A Secure Personal Content Server" (which claims priority to International Application No. PCT/US00/21189, filed Aug. 4, 2000, which claims priority to U.S. Appl. No. 60/147,134, filed Aug. 4, 1999, and to U.S. Appl. No. 60/213,489, filed Jun. 23, 2000).
U.S. Appl. No. 09/657,181, filed Sep. 7, 2000, entitled "Method and Device for Monitoring and Analyzing Signals".
U.S. Appl. No. 10/805,484, filed Mar. 22, 2004, entitled "Method and Device for Monitoring and Analyzing Signals"(which claims priority to U.S. Appl. No. 09/671,739, filed Sep. 29, 2000, which is a CIP of U.S. Appl. No. 09/657,181).
U.S. Appl. No. 09/956,262, filed Sep. 20, 2001, entitled "Improved Security Based on Subliminal and Supraliminal Channels for Data Objects".
U.S. Appl. No. 11/518,806, filed Sep. 11, 2006, entitled "Improved Security Based on Subliminal and Supraliminal Channels for Data Objects".
U.S. Appl. No. 11/026,234, filed Dec. 30, 2004, entitled "Z-Transform Implementation of Digital Watermarks".
U.S. Appl. No. 11/592,079, filed Nov. 2, 2006, entitled "Linear Predictive Coding Implementation of Digital Watermarks".
U.S. Appl. No. 09/731,039, filed Dec. 7, 2000, entitled "System and Methods for Permitting Open Access to Data Objects and for Securing Data within the Data Objects".
U.S. Appl. No. 11/647,861, filed Dec. 29, 2006, entitled "System and Methods for Permitting Open Access to Data Objects and for Securing Data within the Data Objects".
Menezes, Alfred J., Handbook of Applied Crypography, CRC Press, p. 46, 1997.
Merriam-Webster's Collegiate Dictionary, 10th Ed., Merriam Webster, Inc., p. 207.
Brealy, et al., Principles of Corporate Finance, "Appendix A-Using Option Valuation Models", 1984, pp. 448-449.
Copeland, et al., Real Options:A Practioner's Guide, 2001 pp. 106-107, 201-202, 204-208.
Sarkar, M. "An Assessment of Pricing Mechanisms for the Internet—A Regulatory Imperative", presented MIT Workshop on Internet Economics, Mar. 1995 http://www.press.vmich.edu/iep/works/SarkAsses.html on.
Crawford, D.W. "Pricing Network Usage:A Market for Bandwith of Market Communication?" presented MIT Workshop on Internet Economics, Mar. 1995 http://www.press.vmich.edu/iep/works/CrawMarket.html on March.
Caronni, Germano, "Assuring Ownership Rights for Digital Images", published proceeds of reliable IT systems, v15 '95, H.H. Bruggemann and W Gerhardt-Hackel (Ed) Viewing Publishing Company Germany 1995.
Zhao, Jian. "A WWW Service to Embed and Prove Digital Copyright Watermarks", Proc. of the european conf. on Mulitmedia Applications, Services & Techinques Louvain-La-Nevve Belgium May 1996.

Gruhl, Daniel et al.,Echo Hiding. In Proceeding of the Workshop on Information Hiding. No. 1174 in Lecture Notes in Computer Science,Cambridge,England (May/Jun. 1996).
Oomen,A.W.J. et al., A Variable Bit Rate Buried Data Channel for Compact Disc, J.Audio Eng.Sc.,vol. 43,No. 1/2,pp. 23-28 (1995).
Ten Kate,W. et al., A New Surround-Stereo-Surround Coding Techniques, J. Audio Eng.Soc.,vol. 40,No. 5,pp. 376-383 (1992).
Sklar,Bernard, Digital Communications, pp. 601-603 (1988).
Jayant, N.S. et al., Digital Coding of Waveforms, Prentice Hall Inc., Englewood Cliffs,NJ, pp. 486-509 (1984).
van Schyndel, et al. A digital Watermark, IEEE Int'l Computer Processing Conference, Austin,TX, Nov. 13-16, 1994, pp. 86-90.
Smith, et al. Modulation and Information Hiding in Images, Springer Verlag, 1st Int'l Workshop, Cambridge, UK, May 30-Jun. 1, 1996, pp. 201-227.
Kutter, Martin et al., Digital Signature of Color Images Using Amplitude Modulation, SPIE-E197, vol. 3022, pp. 518-527.
Puate, Joan et al., Using Fractal Compression Scheme to Embed a Digital Signature into an Image, SPIE-96 Proceedings, vol. 2915, Mar. 1997, pp. 108-118.
Swanson, Mitchell D.,et al., Transparent Robust Image Watermarking, Proc. of the 1996 IEEE Int'l Conf. on Image Processing, vol. 111, 1996 , pp. 211-214.
Swanson, Mitchell D., et al. Robust Data Hiding for Images, 7th IEEE Digital Signal Processing Workshop, Leon, Norway. Sep. 1-4, 1996, pp. 37-40.
Zhao, Jian et al., Embedding Robust Labels into Images for Copyright Protection, Proceeding of the Know Right '95 Conference, pp. 242-251.
Koch, E., et al., Towards Robust and Hidden Image Copyright Labeling, 1995 IEEE Workshop on Nonlinear Signal and Image Processing, Jun. 1995 Neos Marmaras pp. 4.
Van Schyandel, et al., Towards a Robust Digital Watermark, Second Asain Image Processing Conference, Dec. 6-8, 1995,Singapore, vol. 2,pp. 504-508.
Tirkel,A.Z., A Two-Dimensional Digital Watermark, DICTA '95, Univ. of Queensland, Brisbane, Dec. 5-8, 1995, pp. 7.
Tirkel,A.Z., Image Watermarking—A Spread Spectrum Application, ISSSTA '96, Sep. 96, Mainz, German, pp. 6.
O'Ruanaidh, et al. Watermarking Digital Images for Copyright Protection, IEEE Proceedings, vol. 143, No. 4, Aug. 96, pp. 250-256.
Cox, et al., Secure Spread Spectrum Watermarking for Multimedia, NEC Research Institute, Techinal Report 95-10, pp. 33.
Kahn, D., The Code Breakers, The MacMillan Company, 1969, pp. xIII, 81-83,513,515,522-526,863.
Boney, et al., Digital Watermarks for Audio Signals, EVSIPCO, 96, pp. 473-480.
Dept. of Electrical Engineering, Del Ft University of Technology, Del ft The Netherlands,Cr.C. Langelaar et al.,Copy Protection for Mulitmedia Data based on Labeling Techniques Jul. 1996 9 pp.
F. Hartung, et al., Digital Watermarking of Raw and Compressed Video, SPIE vol. 2952, pp. 205-213.
Craver, et al., Can Invisible Watermarks Resolve Rightful Ownerships? IBM Research Report, RC 20509 (Jul. 25, 1996) 21 pp.
Press, et al., Numerical Recipes In C, Cambridge Univ. Press, 1988, pp. 398-417.
Pohlmann, Ken C., Principles of Digital Audio, 3rd Ed., 1995, pp. 32-37, 40-48,138,147-149,332,333,364, 499-501,508-509,564-571.
Pohlmann, Ken C., Principles of Digital Audio, 2nd Ed., 1991, pp. 1-9,19-25,30-33,41-48,54-57,86-107,375-387.
Schneier, Bruce, Applied Cryptography, John Wiley & Sons, inc. , New York,1994, pp. 68,69,387-392,1-57,273-275,321-324.
Boney, et al., Digital Watermarks for Audio Signals, Proceedings of the International Conf. on Multimedia Computing and Systems, Jun. 17-23, 1996 Hiroshima Japan 0-818607436-9196 pp. 473-480.
Johnson, et al., Transform Permuted Watermarking for Copyright Protection of Digital Video, IEEE Globecom 1998, Nov. 8-12, 1998, New York New York vol. 2 1998 pp. 684-689 (ISBN 0-7803-4985-7).
Rivest, et al., "Pay Word and Micromint: Two Simple Micropayment Schemes, "MIT Laboratory for Computer Science, Cambridge, MA, May 7, 1996 pp. 1-18.
Bender, et al., Techniques for Data Hiding, IBM Systems Journal, vol. 35, Nos. 3 & 4,1996,pp. 313-336.

Moskowitz, Bandwith as Currency, IEEE Multimedia, Jan.-Mar. 2003, pp. 14-21.

Moskowitz, MultiMedia Security Technologies for Digital Rights Management, 2006, Academic Press, "Introduction-Digital Rights Management" pp. 3-22.

Rivest, et al., "*Payword and Micromint: Two Simple Micropayment Schemes*" MIT Laboratory for Computer Science, Cambridge, MA, Apr. 27, 2001, pp. 1-18.

Tomsich, et al., "Towards a secure and de-centralized digital watermarking infrastructure for the protection of Intellectual Property", in Electronic Commerce and Web Technologies, Proceedings (ECWEB.

Moskowitz, "What is Acceptable Quality in the Application of Digital Watermarking: Trade-offs of Security, Robustness and Quality", IEEE Computer Society Proceedings of ITCC 2002 Apr. 10, 2002 pp. 80-84.

Lemma, et al. "Secure Watermark Embedding through Partial Encryption", International Workshop on Digital Watermarking ("IWDW" 2006), Springer Lecture Notes in Computer Science,2006. (to appear) 13.

Kocher, et al., "Self Protecting Digital Content", Technical Report from the CRI Content Security Research Initiative, Crytography Research, Inc. 2002-2003, 14 pages.

Sirbu, M. et al., "Net Bill: An Internet Commerce System Optimized for Network Delivered Services", Digest of Papers of the Computer Society Computer Conference (Spring), Mar. 5, 1995, pp. 20-25, vol. CONF40.

Schunter, M. et al., "A Status Report on the SEMPER framework for Secure Electronic Commerce", Computer Networks and ISDN Systems, Sep. 30, 1998 pp. 1501-1510 vol. 30 No. 16-18 NI North Holland.

Konrad, K. et al., "Trust and Elecronic Commerce—more than a techinal problem," Proceedings of the 18th IEEE Symposium on Reliable Distributed Systems Oct. 19-22, 1999 pp. 360-365 Lausanne.

Kini, a. et al., "Trust in Electronic Commerce: Definition and Theoretical Considerations", Proceedings of the 31st Hawaii Int'l Conf on System Sciences (Cat. No. 98TB100216). Jan. 6-9, 1998, pp. 51-61, Los.

PCT International Search Report, completed Sep. 13, 1995; authorized officer Huy D. Vu (PCT/US95/08159) (2 pages).

PCT International Search Report, completed Jun. 11, 1996; authorized officer Salvatore Cangialosi (PCT/US96/10257) (4 pages).

Supplementary European Search Report, completed Mar. 5, 2004; authorized officer J. Hazel (EP 96 91 9405) (1 page).

PCT International Search Report, completed Apr. 4, 1997; authorized officer Bernarr Earl Gregory (PCT/US97/00651) (1 page).

PCT International Search Report, completed May 6, 1997; authorized officer Salvatore Cangialosi (PCT/US97/00652) (3 pages).

PCT International Search Report, completed Oct. 23, 1997; authorized officer David Cain (PCT/US97/11455) (1 page).

PCT International Search Report, completed Jul. 12, 1999; authorized officer R. Hubeau (PCT/US99/07262) (3 pages).

PCT International Search Report, completed Jun. 30, 2000; authorized officer Paul E. Callahan (PCT/US00/06522) (7 pages).

Supplementary European Search Report, completed Jun. 27, 2002; authorized officer M. Schoeyer (EP 00 91 9398) (1 page).

PCT International Search Report, date of mailing Mar. 15, 2001; authorized officer Maria Brouwers (PCT/US00/18411) (5 pages).

PCT International Search Report, completed Jul. 20, 2001; authorized officer A. Sigolo (PCT/US00/18411) (5 pages).

PCT International Search Report, completed Mar. 20, 2001; authorized officer P. Corcoran (PCT/US00/33126) (6 pages).

PCT International Search Report, completed Jan. 26, 2001; authorized officer Gilberto Barron (PCT/US00/21189) (3 pages).

Delaigle, J.-F., et al. "Digital Watermarking," Proceedings of the SPIE, vol. 2659, Feb. 1, 1996, pp. 99-110 (Abstract).

Schneider, M., et al. "Robust Content Based Digital Signature for Image Authentication," Proceedings of the International Conference on Image Processing (IC, Lausanne), Sep. 16-19, 1996, pp. 227-230, IEEE ISBN:.

Fabien A.P. Petitcolas, Ross J. Anderson and Markkus G. Kuhn, "Attacks on Copyright Marking Systems," LNCS, vol. 1525, Apr. 14-17, 1998, pp. 218-238 ISBN 3-540-65386-4.

Joseph J.K. O'Ruanaidh and Thierry Pun, "Rotation, Scale and Translation Invariant Digital Image Watermarking", Submitted to Signal Processing Aug. 21, 1997 19 pages.

Schneier, Bruce, *Applied Cryptography*, $2^{nd}$ Ed., John Wiley & Sons, pp. 9-10, 1996.

Merrian-Webster's Collegiate Dictionary, $10^{th}$ Ed., Merrian Webster, Inc., p. 207.

Copeland, et al., *Real Options: A Practioners Guide*, 2001 pp. 106-107, 201-202, 204-208.

Sarkar, M. "An Assessment of Pricing Mechanisms for the Internet—A Regulatory Imperative", presented MIT Workshop on Internet Economics, Mar. 1995, http://www.press.unich.edu/jep/works/sarkAssess.html on Mar. 12, 1995.

Crawford, D.W. "Pricing Network Usage—A Market for Bandwidth of Market Communication?" presented MIT Workshop on Internet Economics, Mar. 1995 http://www.press.unich.edu/jep/works/CrawMarket.html on Mar. 12, 1995.

Low, S.H., "Equilibrium Allocation and Pricing of Variable Resources Among User-Suppliers", 1988. http://www.citeseer.nj.nec.com/366503.html.

Caronni, Germano, "Assuring Ownership Rights For Digital Images", published Proceedings of Reliable IT Systems, VIS '95, H.H. Bruggemann and W. Gerhardt-Häckel (Ed.), Vieweg Publishing Company, Germany, 1995.

Zhao, Jien. "A WWW Service to Embed and Prove Digital Copyright Watermarks", Proc. of the European Conf. on Multimedia Applications, Services & Techniques Louvain-La-Nevve, Belgium, May 1996.

Gruhl, Daniel et al., *Echo Hiding*, In Proceeding of the Workshop on Information Hiding, No. 1174 in Lecture Notes in Computer Science, Cambridge, England (May/Jun. 1996).

Oomen, A.W.J. etal., *A Variable Bit Rate Buried Data Channel for Compact Disc*, J. Audio Eng.Soc., vol. 43, No. 1/2, pp. 23-28 (1995).

Ten Kate, W. et al., *A New Surround-Stereo—Surround Coding Techniques*, J. Audio Eng. Soc., vol. 40, No. 5, pp. 376-383 (1992).

Gerzon, Michael et al., *A High Rate Buried Data Channel for Audio CD*, presentation notes, Audio Engineering Soc. $94^{th}$ Convention (1993).

Bender, Walter R. et al, *Techniques for Data Hiding*, SPIE Int. Soc. Opt. Eng., vol. 2420, p. 164-173, 1995.

Zhao, Jian et al., *Embedding Robust Labels into Images For Copyright Protection*, (XP 000571967), pp. 242-251, 1995.

Schneier, Bruce, *Applied Cryptography*, $1^{st}$ Ed., pp. 67-68, 1994.

Ten Kate, W. et al., "Digital Audio Carrying Extra Information", IEEE, CH2847-2/90/0000-1097, (1990).

Van Schyndel, et al. *A digital watermark*, IEEE Int'l Computer Processing Conference, Austin, TX, Nov. 13-16, 1994, pp. 86-90.

Smith, et al. *Modulation and Information Hiding in Images*, Springer Verlag, $1^{st}$ Int'l Workshop, Cambridge, UK, May 30-Jun. 1, 1996, pp. 207-227.

Puate, Joan et al., *Using Fractel Compression Scheme to Embed a Digital Signature into an Image*, SPIE-96 Proceedings, vol. 2915, Mar. 1997, pp. 108-118.

Swanson, Mitchell D., et al., *Transparent Robust Image Watermarking*, Proc. of the 1996 IEEE Int'l Conf. on Image Processing, vol. 111, 1996, pp. 211-214.

Swanson, Mitchell D., et al., *Robust Data Hiding for Images*, $7^{th}$ IEEE Digital Signal Processing Workshop, Leon, Norway, Sep. 1-4, 1996, pp. 37-40.

Zhao, Jian et al., *Embedding Robust Labels into Images for Copyright Protection*, Proceedings of the KnowRight '95 Conference, pp. 242-251.

Koch E. et al., *Towards Robust and Hidden Image Copyright Labeling*, 1995 IEEE Workshop on Nonlinear Signal and Image Processing, Jun. 1995, Neos Marmaras, pp. 4.

Van Schyadel, et al., *Towards a Robust Digital Watermark*, Sevid Asian Image Processing Conference, Dec. 6-8, 1995, Singapore, vol. 2, pp. 504-508.

Tirkel, A.Z., *A Two-Dimensional Digital Watermark*, DICTA '95, Univ. of Queensland, Brisbane, Dec. 5-8, 1995, pp. 7.

Tirkel, A.Z., *Image Watermarking—A Spread Spectrum Application*, ISSSTA'96, Sep. 96, Mainz, German, pp. 6.
O'Ruanaidh et al. *Watermrking Digital Images for Copyright Protection*, IEE Proceedings, vol. 143, No. 4, Aug. 96, pp. 250-256.
Cox, et al, *Secure Spread Spectrum Watermarking For Multimedia*, NEC Research Institute, Technical Report 95-10, pp. 33.
Kahn, D., *The Code Breakers*, The MacMillan Company, 1969, pp. XIII, 81-83, 513, 515, 522-526, 863.
Boney, et al., *Digital Watermarks for Audio Signals*, EVSIPCO,96, pp. 473-480.
Dept. of Electrical Engineering, Delft University of Technology, Delft, The Netherlands, Cr.C. Langelaar et al., *Copy Protection For Multimedia Data based on Labeling Techniques*, Jul. 1996, 9 pp.
F.Hertung, et al., *Digital Watermarking of Raw and Compressed Video*, SPIE vol. 2952, pp. 205-213.
Craver et al., *Can Invisible Watermarks Resolve Rightful Ownerships?*, IBM Research Report, RC 20509 (Jul. 25, 1996) 21 pp.
Press, et al., *Numerical Recipes Inc*, Cambridge Univ. Press, 1988, pp. 398-417.
Pohlmann, Ken C., *Principles of Digital Audio*, $3^{rd}$ Ed., 1995, pp. 32-37, 40-48, 138, 147-149, 332, 333, 364, 499-501, 508-509, 564-571.
Pohlmann, Ken C., *Principles of Digital Audio*, $2^{nd}$ Ed., 1991, pp. 1-9, 19-25, 30-33, 41-48, 54-57, 86-107, 375-387.
Schneier, Bruce, *Applied Cryptography*, John Wiley & Sons, Inc., New York, 1994, pp. 68-69, 387-392, 1-57, 273-275, 321-324.
Boney, et al., *Digital Watermarks for Audio Signals*, Proceedings of the International Conf. on Multimedia Computing and Systems, Jun. 17-23, 1996, Hiroshima, Japan, 0-8186-7436-9196, pp. 473-480.
Johnson, et al., *Transform Permuted Watermarking for Copyright Protection of Digital Video*, IEEE GlobeCom 1998, Nov. 8-12, 1998, New York, New York, vol. 2, 1998, pp. 684-689. (ISBN 0-7803-4985-7).
U.S. Appl. No. 12/655,002, filed Dec. 22, 2009, entitled "Method for Combining Transfer Function with Predetermined Key Creation".
U.S. Appl. No. 12/592,331, filed Nov. 23, 2009, entitled "Optimization Methods for the Insertion, Protection, and Detection of Digital Watermarks in Digital Data"—Projected Publication Mar. 25, 2010.
U.S. Appl. No. 12/590,553, filed Nov. 10, 2009, entitled "Optimization Methods for the Insertion, Protection, and Detection of Digital Watermarks in Digital Data".
U.S. Appl. No. 12/590,681, filed Nov. 12, 2009, entitled "Optimization Methods for the Insertion, Protection, and Detection of Digital Watermarks in Digital Data".
U.S. Appl. No. 12/655,036, filed Dec. 22, 2009, entitled "Utilizing Data Reduction in Steganographic and Cryptographic Systems".
U.S. Appl. No. 10/049,101, filed Feb. 8, 2002, entitled "A Secure Personal Content Server" (which claims priority to International Application No. PCT/US00/21189, filed Aug. 4, 2000, which claims priority to U.S. Appl. No. 60/147,134, filed Aug. 4, 1999, and to U.S. Appl. No. 60/213,489, filed Jun. 23, 2000)—(issued as U.S. Patent No. 7,475,246).
U.S. Appl. No. 12/287,443, filed Oct. 9, 2008, entitled "A Secure Personal Content Server" (which claims priority to International Application No. PCT/US00/21189, filed Aug. 4, 2000, which claims priority to U.S. Appl. No. 60/147,134, filed Aug. 4, 1999, and to U.S. Appl. No. 60/213,489, filed Jun. 23, 2000)—Publication No. 20090089427—Apr. 2, 2009.
U.S. Appl. No. 12/655,357, filed Dec. 22, 2009, entitled "Method And Device For Monitoring And Analyzing Signals".
U.S. Appl. No. 10/805,484, filed Mar. 22, 2004, entitled "Method and Device for Monitoring and Analyzing Signals"(which claims priority to U.S. Appl. No. 09/671,739, filed Sep. 29, 2000, which is a CIP of U.S. Appl. No. 09/657,181)—Publication No. 20040243540—Dec. 2, 2004—(abandoned).
PCT Application No. PCT/US95/08159, filed Jun. 26, 1995, entitled, "Digital Information Commodities Exchange with Virtual Menuing".
PCT Application No. PCT/US96/10257, filed Jun. 7, 1996, entitled, "Steganographic Method and Device"—corresponding to—EPO Application No. 96919405.9, entitled "Steganographic Method and Device".

PCT Application No. PCT/US97/00651, filed Jan. 16, 1997, entitled, "Method for Stega-Cipher Protection of Computer Code"—corresponding to AU199718294A (not available).
PCT Application No. PCT/US97/00652, filed Jan. 17, 1997, entitled, "Method for an Encrypted Digital Watermark"—corresponding to AU199718295A (not available).
PCT Application No. PCT/US97/11455, filed Jul. 2, 1997, entitled, "Optimization Methods for the Insertion, Protection and Detection of Digital Watermarks in Digitized Data"—corresponding to AU199735881A (not available).
PCT Application No. PCT/US99/07262, filed Apr. 2, 1999, entitled, "Multiple Transform Utilization and Applications for Secure Digital Watermarking"—corresponding to—Japan App. No. 2000-542907, entitled "Multiple Transform Utilization and Application for Secure Digital Watermarking".
PCT Application No. PCT/US00/06522, filed Mar. 14, 2000, entitled, "Utilizing Data Reduction in Steganographic and Cryptographic Systems".
PCT Application No. PCT/US00/18411, filed Jul. 5, 2000, entitled, "Copy Protection of Digital Data Combining Steganographic and Cryptographic Techniques"—corresponding to AU200060709A5 (not available).
PCT Application No. PCT/US00/21189, filed Aug. 4, 2000, entitled, "A Secure Personal Content Server".
PCT Application No. PCT/US00/33126, filed Dec. 7, 2000, entitled, "Systems, Methods and Devices for Trusted Transactions"—corresponding to AU200120659A5 (not available).
EPO Divisional Patent Application No. 07112420.0, entitled "Steganographic Method and Device" (corresponding to PCT Application No. PCT/US96/10257, filed Jun. 7, 1996, entitled, "Steganographic Method and Device").
Oasis (Dig Out Your Soul), Big Brother Recordings Ltd., Promotion CD image, 2009, 1 page.
European Search Report, completed Oct. 15, 2007; authorized officer James Hazel (EP 07 11 2420) (9 pages).
Rivest, R. "Chaffing and Winnowing: Confidentiality without Encryption", MIT Lab for Computer Science, http://people.csail.mit.edu/rivest/Chaffing.txt, Apr. 24, 1998, 9 pp.
VenDisc, "The search for a Rational Solution to Digital Rights Management (DRM)", http://64.244.235.240/news/whitepaper/docs/veridisc_white_paper.pdf, 2001, 15 pp.
Cayre, et al., "Kerckhoff's-Based Embedding Security Classes for WOA Data Hiding". IEEE Transactions on Information Forensics and Security, vol. 3 No. 1, Mar. 2008, 15 pp.
Wayback Machine, dated Aug. 26, 2007, http://web.archive.org/web/20070826151732/http://www.screenplaysmag.com/tabid/96/articleType/ArticleView/articleId/495/Default.aspx/.
EPO Application No. 96919405.9, entitled "Steganographic Method and Device"; published as EP0872073 (A2), Oct. 21, 1998.
Jap. App. No. 2000-542907, entitled "Multiple Transform Utilization and Application for Secure Digital Watermarking"; which is a JP national stage of PCT/US1999/007262, published as WO/1999/052271, Oct. 14, 1999.
PCT Application No. PCT/US00/21189, filed Aug. 4, 2000, entitled, "A Secure Personal Content Server", Pub. No. WO/2001/018628 ; Publication Date: Mar. 15, 2001.
Schneier, Bruce, Applied Cryptography, 2nd Ed., John Wiley & Sons, pp. 9-10, 1996.
Menezes, Alfred J., Handbook of Applied Cryptography, CRC Press, p. 46, 1997.
1997, Merriam-Webster's Collegiate Dictionary, 10th Ed., Merriam Webster, Inc., p. 207.
Brealy, et al., Principles of Corporate Finance, "Appendix A—Using Option Valuation Models", 1984, pp. 448-449.
Copeland, et al., Real Options: A Practitioner's Guide, 2001 pp. 106-107, 201-202, 204-208.
Sarkar, M. "An Assessment of Pricing Mechanisms for the Internet-A Regulatory Imperative", presented MIT Workshop on Internet Economics, Mar. 1995 http://www.press.vmich.edu/iep/works/SarkAsses.html on.

Crawford, D.W. "Pricing Network Usage: A Market for Bandwidth of Market Communication?" presented MIT Workshop on Internet Economics, Mar. 1995 http://www.press.vmich.edu/iep/works/CrawMarket.html on March.

Low, S.H., "Equilibrium Allocation and Pricing of Variable Resources Among User-Suppliers", 1988. http://www.citesear.nj.nec.com/366503.html.

Caronni, Germano, "Assuring Ownership Rights for Digital Images", published proceeds of reliable IT systems, v15 '95, H.H. Bruggemann and W. Gerhardt-Hackel (Ed) Viewing Publishing Company Germany 1995.

Zhao, Jian. "A WWW Service to Embed and Prove Digital Copyright Watermarks", Proc. of the European conf. on Multimedia Applications, Services & Techniques Louvain-La-Nevve Belgium May 1996.

Gruhl, Daniel et al., Echo Hiding. In Proceeding of the Workshop on Information Hiding. No. 1174 in Lecture Notes in Computer Science, Cambridge, England (May/Jun. 1996).

Oomen, A.W.J. et al., A Variable Bit Rate Buried Data Channel for Compact Disc, J.AudioEng. Sc., vol. 43, No. 1/2, pp. 23-28 (1995).

Ten Kate, W. et al., A New Surround-Stereo-Surround Coding Techniques, J. Audio Eng.Soc., vol. 40,No. 5,pp. 376-383 (1992).

Gerzon, Michael et al., A High Rate Buried Data Channel for Audio CD, presentation notes, Audio Engineering Soc. 94th Convention (1993).

Sklar, Bernard, Digital Communications, pp. 601-603 (1988).

Jayant, N.S. et al., Digital Coding of Waveforms, Prentice Hall Inc., Englewood Cliffs, NJ, pp. 486-509 (1984).

Bender, Walter R. et al., Techniques for Data Hiding, SPIE Int. Soc. Opt. Eng., vol. 2420, pp. 164-173, 1995.

Zhao, Jian et al., Embedding Robust Labels into Images for Copyright Protection, (xp 000571976), pp. 242-251, 1995.

Menezes, Alfred J., Handbook of Applied Cryptography, CRC Press, p. 175, 1997.

Schneier, Bruce, Applied Cryptography, 1st Ed., pp. 67-68, 1994.

Ten Kate, W. et al., "Digital Audio Carrying Extra Information", IEEE, CH 2847-2/90/0000-1097, (1990).

Van Schyndel, et al., "A digital Watermark," IEEE Int'l Computer Processing Conference, Austin,TX, Nov. 13-16, 1994, pp. 86-90.

Smith, et al. "Modulation and Information Hiding in Images", Springer Verlag, 1st Int'l Workshop, Cambridge, UK, May 30-Jun. 1, 1996, pp. 207-227.

1997, Kutter, Martin et al., "Digital Signature of Color Images Using Amplitude Modulation", SPIE-E197, vol. 3022, pp. 518-527.

Puate, Joan et al., "Using Fractal Compression Scheme to Embed a Digital Signature into an Image", SPIE-96 Proceedings, vol. 2915, Mar. 1997, pp. 108-118.

Swanson, Mitchell D.,et al., "Transparent Robust Image Watermarking", Proc. of the 1996 IEEE Int'l Conf. on Image Processing, vol. 111, 1996 , pp. 211-214.

Swanson, Mitchell D., et al. "Robust Data Hiding for Images", 7th IEEE Digital Signal Processing Workshop, Leon, Norway. Sep. 1-4, 1996, pp. 37-40.

Zhao, Jian et al., "Embedding Robust Labels into Images for Copyright Protection", Proceeding of the Know Right '95 Conference, pp. 242-251.

Koch, E., et al., "Towards Robust and Hidden Image Copyright Labeling", 1995 IEEE Workshop on Nonlinear Signal and Image Processing, Jun. 1995 Neos Marmaras pp. 4.

Van Schyandel, et al., "Towards a Robust Digital Watermark", Second Asain Image Processing Conference, Dec. 6-8, 1995, Singapore, vol. 2, pp. 504-508.

Tirkel,A.Z., "A Two-Dimensional Digital Watermark", DICTA '95, Univ. of Queensland, Brisbane, Dec. 5-8, 1995, pp. 7.

Tirkel,A.Z., "Image Watermarking—A Spread Spectrum Application", ISSSTA '96, Sep. 1996, Mainz, German, pp. 6.

O'Ruanaidh, et al. "Watermarking Digital Images for Copyright Protection", IEEE Proceedings, vol. 143, No. 4, Aug. 1996, pp. 250-256.

Cox, et al., Secure Spread Spectrum Watermarking for Multimedia, NEC Research Institute, Techinal Report 95-10, pp. 33.

Kahn, D., "The Code Breakers", The MacMillan Company, 1969, pp. xIII, 81-83, 513, 515, 522-526, 863.

Boney, et al., Digital Watermarks for Audio Signals, EVSIPCO, 96, pp. 473-480 (Mar. 14, 1997).

Dept. of Electrical Engineering, Del Ft University of Technology, Del ft The Netherlands, Cr.C. Langelaar et al.,"Copy Protection for Multimedia Data based on Labeling Techniques", Jul. 1996 9 pp.

F. Hartung, et al., "Digital Watermarking of Raw and Compressed Video", SPIE vol. 2952, pp. 205-213.

Craver, et al., "Can Invisible Watermarks Resolve Rightful Ownerships?", IBM Research Report, RC 20509 (Jul. 25, 1996) 21 pp.

Press, et al., "Numerical Recipes in C", Cambridge Univ. Press, 1988, pp. 398-417.

Pohlmann, Ken C., "Principles of Digital Audio", 3rd Ed., 1995, pp. 32-37, 40-48:138, 147-149, 332, 333, 364, 499-501, 508-509, 564-571.

Pohlmann, Ken C., "Principles of Digital Audio", 2nd Ed., 1991, pp. 1-9, 19-25, 30-33, 41-48, 54-57, 86-107, 375-387.

Schneier, Bruce, Applied Cryptography, John Wiley & Sons, Inc., New York, 1994, pp. 68, 69, 387-392, 1-57, 273-275, 321-324.

Boney, et al., Digital Watermarks for Audio Signals, Proceedings of the International Conf. on Multimedia Computing and Systems, Jun. 17-23, 1996 Hiroshima, Japan, 0-8186-7436-9196, pp. 473-480.

Johnson, et al., "Transform Permuted Watermarking for Copyright Protection of Digital Video", IEEE Globecom 1998, Nov. 8-12, 1998, New York New York vol. 2 1998 pp. 684-689 (ISBN 0-7803-4985-7).

Rivest, et al., "Pay Word and Micromint: Two Simple Micropayment Schemes," MIT Laboratory for Computer Science, Cambridge, MA, May 7, 1996 pp. 1-18.

Bender, et al., "Techniques for Data Hiding", IBM Systems Journal, (1996) vol. 35, Nos. 3 & 4,1996, pp. 313-336.

Moskowitz, "Bandwith as Currency", IEEE Multimedia, Jan.-Mar. 2003, pp. 14-21.

Moskowitz, Multimedia Security Technologies for Digital Rights Management, 2006, Academic Press, "Introduction—Digital Rights Management" pp. 3-22.

Rivest, et al., "PayWord and Micromint: Two Simple Micropayment Schemes," MIT Laboratory for Computer Science, Cambridge, MA, Apr. 27, 2001, pp. 1-18.

Tomsich, et al., "Towards a secure and de-centralized digital watermarking infrastructure for the protection of Intellectual Property", in Electronic Commerce and Web Technologies, Proceedings (ECWEB)(2000).

Moskowitz, "What is Acceptable Quality in the Application of Digital Watermarking: Trade-offs of Security; Robustness and Quality", IEEE Computer Society Proceedings of ITCC 2002 Apr. 10, 2002 pp. 80-84.

Lemma, et al. "Secure Watermark Embedding through Partial Encryption", International Workshop on Digital Watermarking ("IWDW" 2006). Springer Lecture Notes in Computer Science 2006 (to appear) 13.

Kocher, et al., "Self Protecting Digital Content", Technical Report from the CRI Content Security Research Initiative, Cryptography Research, Inc. 2002-2003 14 pages.

Sirbu, M. et al., "Net Bill: An Internet Commerce System Optimized for Network Delivered Services", Digest of Papers of the Computer Society Computer Conference (Spring) Mar. 5, 1995 pp. 20-25 vol. CONF40.

Schunter, M. et al., "A Status Report on the SEMPER framework for Secure Electronic Commerce", Computer Networks and ISDN Systems, Sep. 30, 1998, pp. 1501-1510 vol. 30 No. 16-18 NL North Holland.

Konrad, K. et al., "Trust and Electronic Commerce—more than a technical problem," Proceedings of the 18th IEEE Symposium on Reliable Distributed Systems Oct. 19-22, 1999, pp. 360-365 Lausanne.

Kini, et al., "Trust in Electronic Commerce: Definition and Theoretical Considerations", Proceedings of the 31st Hawaii Int'l Conf on System Sciences (Cat. No. 98TB100216). Jan. 6-9, 1998. pp. 51-61. Los.

Steinauer D. D., et al., "Trust and Traceability in Electronic Commerce", Standard View, Sep. 1997, pp. 118-124, vol. 5 No. 3, ACM, USA.

Hartung, et al. "Multimedia Watermarking Techniques", Proceedings of the IEEE, Special Issue, Identification & Protection of Multimedia Information, pp. 1079-1107 Jul. 1999 vol. 87 No. 7 IEEE.
European Search Report & European Search Opinion in EP07112420.
Staind (The Singles 1996-2006), Warner Music—Atlantic, Pre-Release CD image, 2006, 1 page.
Radiohead ("Hail To The theif"), EMI Music Group—Capitol, Pre-Release CD image, 2003, 1 page.
U.S. Appl. No. 60/169,274, filed Dec. 7, 1999, entitled "Systems, Methods And Devices For Trusted Transactions".
U.S. Appl. No. 60/234,199, filed Sep. 20, 2000, "Improved Security Based on Subliminal and Supraliminal Channels For Data Objects".
U.S. Appl. No. 09/671,739, filed Sep. 29, 2000, entitled "Method And Device For Monitoring And Analyzing Signals".
Tirkel, A.Z., "A Two-Dimensional Digital Watermark", Scientific Technology, 686, 14, date unknown.
PCT International Search Report in PCT/US95/08159.
PCT International Search Report in PCT/US96/10257.
Supplementary European Search Report in EP 96919405.
PCT International Search Report in PCT/US97/00651.
PCT International Search Report in PCT/US97/00652.
PCT International Search Report in PCT/US97/11455.
PCT International Search Report in PCT/US99/07262.
PCT International Search Report in PCT/US00/06522.
Supplementary European Search Report in EP00919398.
PCT International Search Report in PCT/US00/18411.
PCT International Search Report in PCT/US00/33126.
PCT International Search Report in PCT/US00/21189.
Delaigle, J.-F., et al. "Digital Watermarking," Proceedings of the SPIE, vol. 2659, Feb. 1, 1996, pp. 99-110.
Schneider, M., et al. "A Robust Content Based Digital Signature for Image Authentication," Proceedings of the International Conference on Image Processing (IC. Lausanne) Sep. 16-19, 1996, pp. 227-230, IEEE ISBN.
Cox, I. J., et al. "Secure Spread Spectrum Watermarking for Multimedia," IEEE Transactions on Image Processing, vol. 6 No. 12, Dec. 1, 1997, pp. 1673-1686.
Wong, Ping Wah. "A Public Key Watermark for Image Verification and Authentication," IEEE International Conference on Image Processing, vol. 1 Oct. 4-7, 1998, pp. 455-459.
Fabien A.P. Petitcolas, Ross J. Anderson and Markkus G. Kuhn, "Attacks on Copyright Marking Systems," LNCS, vol. 1525, Apr. 14-17, 1998, pp. 218-238 ISBN: 3-540-65386-4.
Ross Anderson, "Stretching the Limits of Steganography," LNCS, vol. 1174, May/Jun. 1996, 10 pages, ISBN: 3-540-61996-8.
Joseph J.K. O'Ruanaidh and Thierry Pun, "Rotation, Scale and Translation Invariant Digital Image Watermarking", pre-publication, Summer 1997 4 pages.
Joseph J.K. O'Ruanaidh and Thierry Pun, "Rotation, Scale and Translation Invariant Digital Image Watermarking", Submitted to Signal Processing Aug. 21, 1997, 19 pages.
Oasis (Dig Out Your Soul), Big Brother Recordings Ltd, Promotional CD image, 2008, 1 page.
Rivest, R. "Chaffing and Winnowing: Confidentiality without Encryption", MIT Lab for Computer Science, http://people.csail.mit.edu/rivest/Chaffing.txt Apr. 24, 1998, 9 pp.
PortalPlayer, PP502 digital media management system-on-chip, May 1, 2003, 4 pp.
VeriDisc, "The Search for a Rational Solution to Digital Rights Management (DRM)", http://64.244.235.240/news/whitepaper,/docs/veridisc.sub.--white.sub.--paper.pdf, 2001, 15 pp.
Cayre, et al., "Kerckhoff's-Based Embedding Security Classes for WOA Data Hiding", IEEE Transactions on Information Forensics and Security, vol. 3 No. 1, Mar. 2008, 15 pp.
Wayback Machine, dated Jan. 17, 1999, http://web.archive.org/web/19990117020420/http://www.netzero.com/, accessed on Feb. 19, 2008.

Namgoong, H., "An Integrated Approach to Legacy Data for Multimedia Applications", Proceedings of the 23rd EUROMICRO Conference, vol., Issue 1-4, Sep. 1997, pp. 387-391.
Wayback Machine, dated Aug. 26, 2007, http://web.archive,org/web/20070826151732/http://www.screenplaysmag.com/t-abid/96/articleType/ArticleView/articleId/495/Default.aspx/.
"YouTube Copyright Policy: Video Identification tool—YouTube Help", accessed Jun. 4, 2009, http://www.google.com/support/youtube/bin/answer.py?h1=en&answer=83766, 3 pp.
PCT Application No. PCT/US95/08159, filed Jun. 26, 1995, entitled, "Digital Information Commodities Exchange with Virtual Menuing", published as WO/1997/001892; Publication Date: Jan. 16, 1997.
PCT Application No. PCT/US96/10257, filed Jun. 7, 1996, entitled "Steganographic Method and Device"—corresponding to—EPO Application No. 96919405.9, entitled "Steganographic Method and Device", published as WO/1996/042151; Publication Date: Dec. 27, 1996.
PCT Application No. PCT/US97/00651, filed Jan. 16, 1997, entitled, "Method for Stega-Cipher Protection of Computer Code", published as WO/1997/026732; Publication Date: Jul. 24, 1997.
PCT Application No. PCT/US97/00652, filed Jan. 17, 1997, entitled, "Method for an Encrypted Digital Watermark", published as WO/1997/026733; Publication Date: Jul. 24, 1997.
PCT Application No. PCT/US97/11455, filed Jul. 2, 1997, entitled, "Optimization Methods for the Insertion, Protection and Detection of Digital Watermarks in Digitized Data", published as WO/1998/002864; Publication Date: Jan. 22, 1998.
PCT Application No. PCT/US99/07262, filed Apr. 2, 1999, entitled, "Multiple Transform Utilization and Applications for Secure Digital Watermarking", published as WO/1999/052271; Publication Date: Oct. 14, 1999.
PCT Application No. PCT/US00/06522, filed Mar. 14, 2000, entitled, "Utilizing Data Reduction in Steganographic and Cryptographic Systems", published as WO/2000/057643; Publication Date: Sep. 28, 2000.
PCT Application No. PCT/US00/18411, filed Jul. 5, 2000, entitled, "Copy Protection of Digital Data Combining Steganographic and Cryptographic Techniques".
PCT Application No. PCT/US00/33126, filed Dec. 7, 2000, entitled "Systems, Methods and Devices for Trusted Transactions", published as WO/2001/043026; Publication Date: Jun. 14, 2001.
EPO Divisional Patent Application No. 07112420.0, entitled "Steganographic Method and Device" corresponding to PCT Application No. PCT/US96/10257, published as WO/1996/042151, Dec. 27, 1996.
U.S. Appl. No. 60/222,023, filed Jul. 31, 2007 entitled "Method and apparatus for recognizing sound and signals in high noise and distortion".
"Techniques for Data Hiding in Audio Files," by Morimoto, 1995.
Howe, Dennis Jul. 13, 1998 http://foldoc..org//steganography.
CSG, Computer Support Group and CSGNetwork.com 1973 http://www.csgnetwork.com/glossarys.html.
QuinStreet Inc. 2010 What is steganography?—A word definition from the Webopedia Computer Dictionary http://www.webopedia.com/terms/steganography.html.
Graham, Robert Aug. 21, 2000 "Hacking Lexicon" http://robertgraham.com/pubs/hacking-dict.html.
Farkex, Inc 2010 "steganography definition of steganography in the Free Online Encyclopedia" http://encyclopedia2.Thefreedictionary.com/steganography.
Horowitz, et al., The Art of Eletronics. $2^{nd}$ Ed., 1989, pp. 7.
Jimmy eat world ("futures"), Interscope Records, Pre-Release CD image, 2004, 1 page.
Aerosmith ("Just Push Play"), Pre-Release CD image, 2001, 1 page.
Phil Collins(Testify) Atlantic, Pre-Release CD image, 2002, 1 page.

* cited by examiner

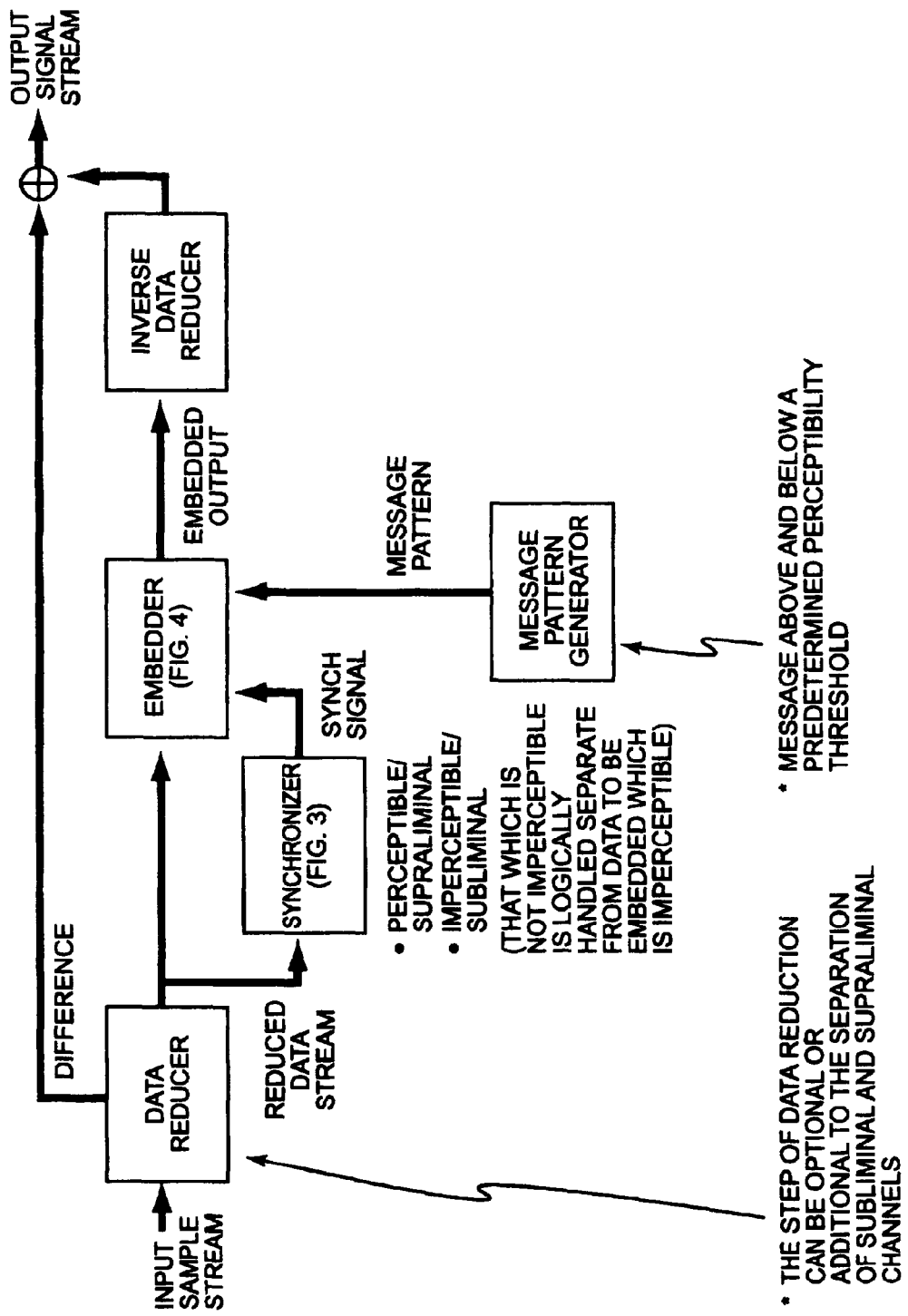
FIG. 1 EMBEDDING SYSTEM

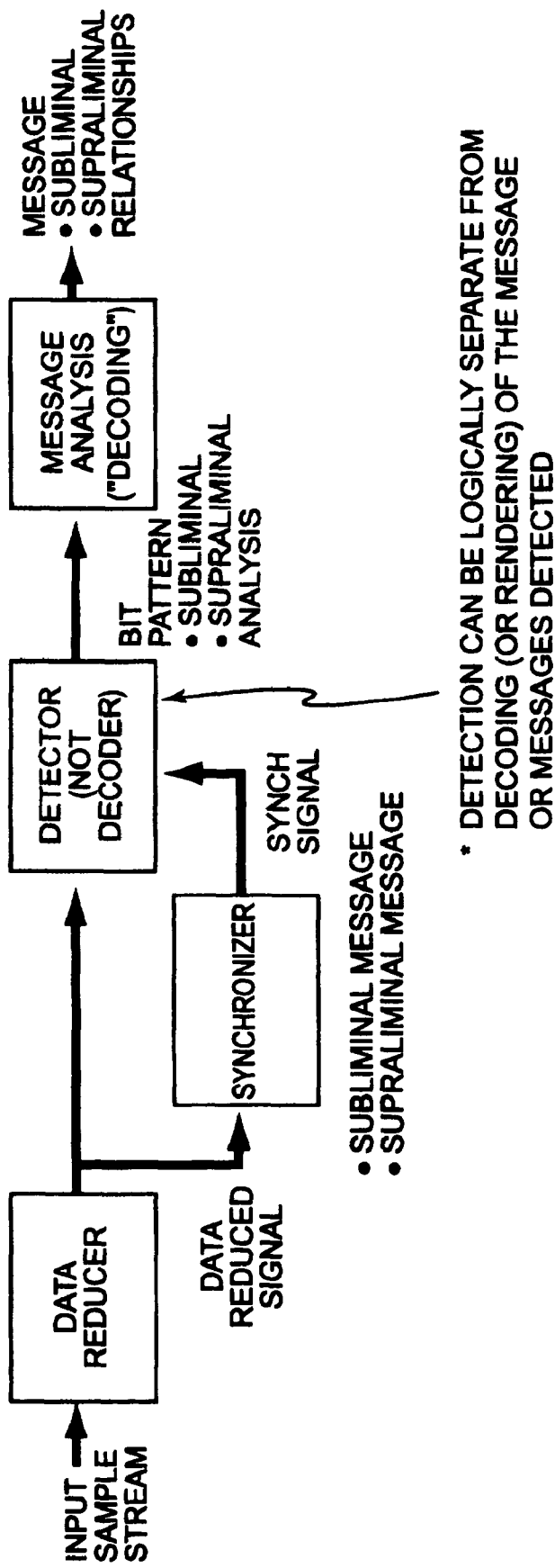
FIG. 2 DETECTOR SYSTEM
(INDEPENDENT FROM THE EMBEDDING SYSTEM OF FIG. 1)

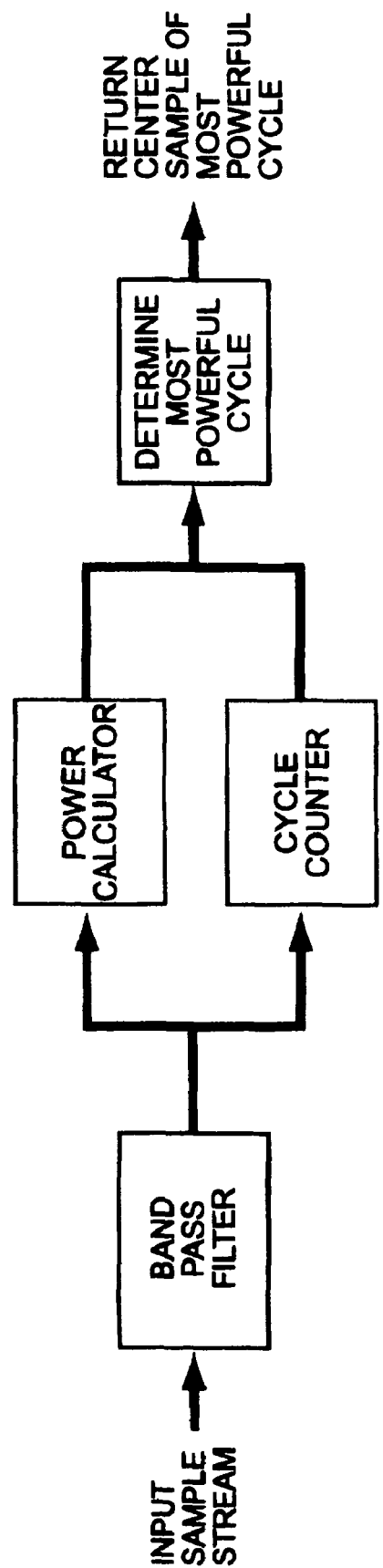
FIG. 3 SYNCHRONIZER

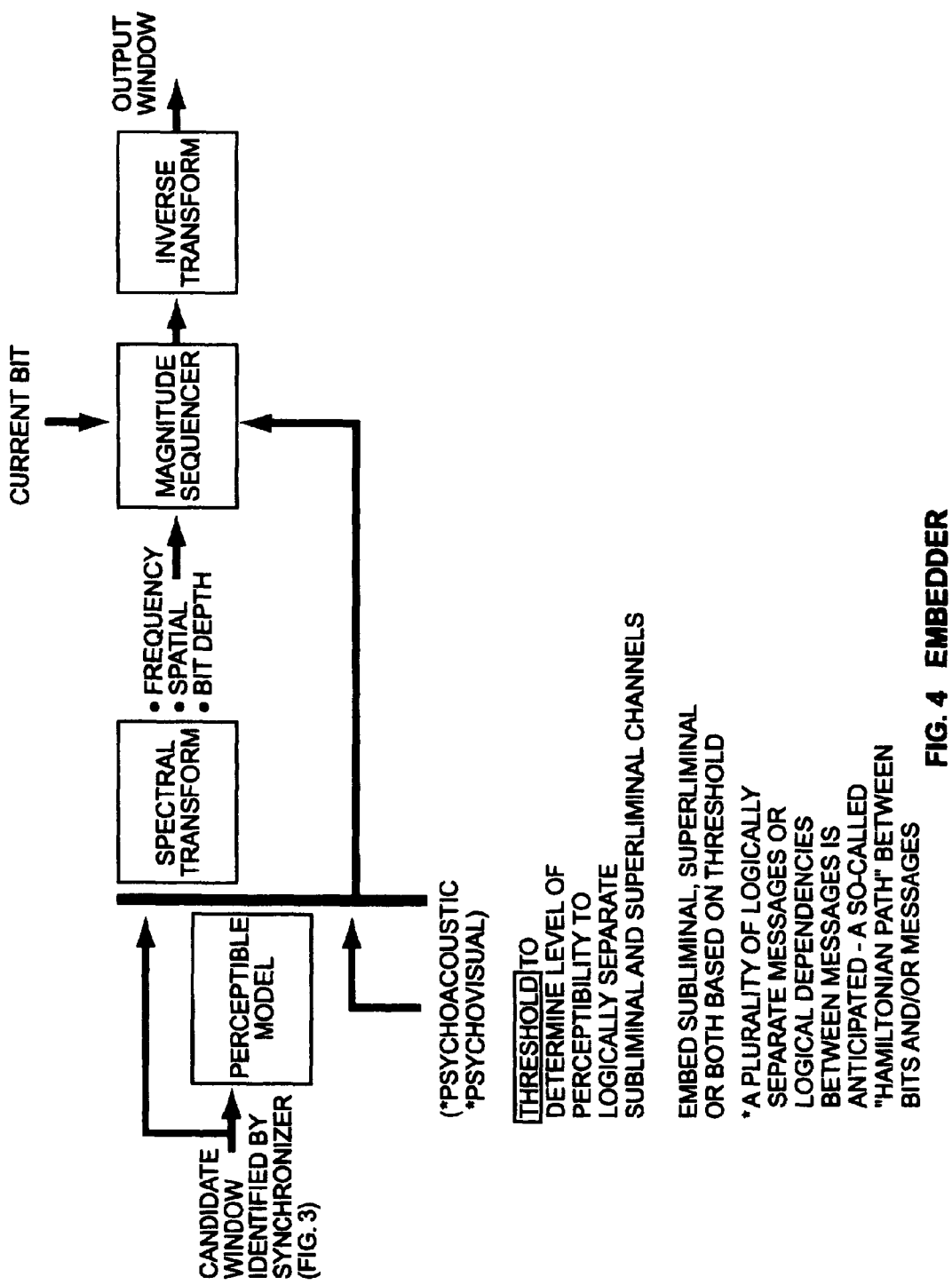
FIG. 4 EMBEDDER

SECURITY BASED ON SUBLIMINAL AND SUPRALIMINAL CHANNELS FOR DATA OBJECTS

CROSS REFERENCE TO RELATED APPLICATIONS

This application Ser. No. 11/518,806, filed Sep. 11, 2006, is a divisional of U.S. patent application Ser. No. 09/956,262, filed Sep. 20, 2001, now U.S. Pat. No. 7,127,615, issued Oct. 24, 2006, which claims the benefit of U.S. provisional patent application Ser. No. 60/234,199, entitled "Improved Security Based on Subliminal and Supraliminal Channels for Data Objects," filed Sep. 20, 2000. The previously identified patents and/or patent applications are hereby incorporated by reference, in their entireties.

BACKGROUND OF THE INVENTION

1. Field of the Invention

This invention relates to security for data objects; more particularly, the present invention relates to improved security based on subliminal and supraliminal channels for data objects.

2. Description of Related Art

Digital watermarking enables a number of security features in handling various data. Application of a cryptographic protocol to the limits of steganographic measures of perceptibility (i.e., embedding a digital watermark just shy of the point where the watermark becomes humanly perceptible) yields both robust and secure techniques. Digital watermarking serves to tamperproof data by maximizing the encoding level of the subliminally embedded data, a form of information hiding, while preserving the fidelity of the cover channel (as represented by a digitally sampled signal stream). When attempts to remove or erase a digital watermark should result in perceptible changes to the cover signal, such watermarking serves as a simple form of perceptible authentication. Moreover, such watermarking preserves the signal's commercial integrity because to remove the watermark necessarily degrades the signal quality, resulting in a lower commercial value of the data, assuming that the quality of the signal plays some role in determinations of that value. Authentication and verification of the watermarked signal are functions of the predetermined quality of the cover signal as intended by the sender of the watermarked data.

SUMMARY OF THE INVENTION

Therefore, a need has arisen for improved security based on subliminal and supraliminal channels for data objects.

In one embodiment, a method for protecting a data signal is disclosed, which method comprises: providing a data signal to be encoded; using a first predetermined key to encode a first set of independent data into the data signal imperceptibly; and using a second predetermined key to encode a second set of independent data into the data signal perceptibly. Optionally, the first and second sets of independent data may be passed through hash functions, and their hash values may be associated with one or the other of the first and second predetermined keys.

In another embodiment, a method of protecting a data object is also disclosed, which method comprises: steganographically encoding a subset of candidate bits in a digitized sample stream; perceptibly manipulating data in the digitized sample stream; and combining the imperceptible and perceptible data changes to create a secure/unique digital sample stream. The steganographic encoding may be handled by one or more of a plurality of cryptographically-generated keys. The steganographic encoding may also be handled by cryptographically-generated key pairs.

In yet another embodiment, a method for securing a data signal is also disclosed, which method comprises: preanalyzing said data signal for candidate watermark/signature bits; steganographically encoding independent data into the data signal into a subset of the candidate watermark bits, at least one time; and encoding the data signal subsequently with a perceptible technique. Preanalysis may include measuring the data signal for at least one of entropy, noise, and a subliminal channel.

In yet another embodiment, a method of protecting a data signal is disclosed, which method comprises: imperceptibly embedding data using a watermarking technique; perceptibly signing the data using the receiver's public key; encrypting the data signal using the receiver's public key and the private key used to watermark the signal; and enabling a receiver to authenticate/verify (separate steps) the data signal while connected to a communications channel.

In yet another embodiment, a method for securing a data signal is disclosed, which method comprises: preanalyzing said data signal for candidate watermark/signature bits; steganographically encoding independent data into the data signal into a subset of the candidate watermark bits, at least one time; and subsequently steganographically encoding the remainder bits. The method may also include the steps of: generating a pattern of 1s and 0s; and embedding the pattern of 1s and 0s into the data signal. The method may also include the additional step of decoding the pattern of 1s and 0s as a means of authenticating the data signal. The method may also use a third predetermined key to perceptibly encode a third set independent data, which independent data is provided to permit authentication by a user. The third set of independent data may also be decoded to authenticate the accuracy of the content of the third set of independent data. A fourth predetermined key may be used to imperceptibly encode a fourth set independent data, which independent data may be intended for access only by a predetermined user. For example, the fourth set of independent data may be encoded using a public key of a user such that only the intended user may decoding the fourth set of independent data, using his private key (wherein the private key and the public key corresponding to a public/private key-pair for the user).

In yet another embodiment, a method for protecting a data signal is also disclosed, which method comprises: using a predetermined key to imperceptibly encode a data stream with a first set of independent data; providing a housing to house said data stream; and placing on the housing a perceptible machine-readable unique identifier. The perceptible machine-readable unique identifier may contain information about the first set of independent data, or may contain information about how the predetermined key was used to embed the first set of independent data. The housing may be a compact disc, a holder for a compact disc, or a housing to hold a magnetic storage medium.

In yet another embodiment, a method for protecting a data signal is disclosed, which method comprises: providing a data signal to be encoded; using a predetermined key to encode a first set of independent data into the data signal imperceptibly and to encode a second set of independent data into the data signal perceptibly. Optionally, the first and second sets of independent data may be passed through hash functions, and their hash values may be associated with the predetermined key. The predetermined key may be based upon the Hamiltonian path, in whole or in part, that exists between the bits that are imperceptible and bits that are perceptible.

BRIEF DESCRIPTION OF THE DRAWINGS

For a more complete understanding of the invention and some advantages thereof, reference is now made to the following descriptions taken in connection with the accompanying drawings in which:

FIGS. 1, 3 and 4 relate to one embodiment of the present invention.

FIG. 2 is a detector system which may be used in connection with the embodiment of FIGS. 1, 3 and 4, or may be used with another embodiment of the present invention.

In particular, FIG. 1 is a functional block diagram for one embodiment of the present invention. FIG. 4 is a functional block diagram that shows the details of the embedding unit illustrated in FIG. 1, while FIG. 3 is a functional block diagram that shows the details for the synchronizer unit illustrated in FIG. 1. The data reducer illustrated in FIG. 1 may be of the type that is disclosed in the Data Reduction application referenced above.

FIG. 2 is a functional block diagram that shows a detector system for an embodiment of the present invention, which detector system may operate independently of the system illustrated in FIG. 1.

Data-Reducer

The data reducer of FIG. 1 may be used to make subsequent operations more efficient, and to separate the signal into different portions for watermarking. Preferably, the data reducer optimally employs a processor that is highly efficient. For audio applications, an example of useful data reduction is downsampling. This corrects for inconsistencies in input sample rate, and can provide significant processor savings on time and frequency domain procedures. Preferably, the downsampling algorithm is chosen for repeatable performance after signal degradation. For this reason, it is preferable to use a windowed sync interpolator in the data reducer. Different target sample rates can be chosen to afford multiple channels of watermarks using the same embedder. The sample rate can also be varied as a function of a key to provide security.

It should be noted that a downsampling data reducer only assures a processor savings during detection. There may actually be an increase in overhead during embedding.

Synchronizer

Different synchronizers may be used for different applications. The simplest synchronizer calculates the offset in sample from the beginning of the track, and creates a sync signal based on a pattern of the offset. This is extremely efficient, but may only be suitable when the decode target can be restored to its original time base and length. Variations on this system may use a signal feature (instead of the beginning of the track) to start the sync pattern—especially with images.

Stream-based decoding and decoding with no reference to the original may require a synchronizer that is based solely on signal characteristics. For this purpose, a module as described in FIG. 3 may be used. The band pass filter may be, for example, a 3 pole Bessel with a center frequency of 0.037*the sample rate, with a bandwidth of 0.0075*the sample rate. Other filters may be used with different characteristics. In general, wider filters may have better performance synchronizing on time-base-altered signals, while narrower filters may have better performance on signals with modified frequency spectra.

Embedder

The embedder may use a frequency domain transformation to weight the strengths of different frequency bands (see, for example, FIG. 4). The psychoacoustic/psychovisual model matches the candidate window with rejection criteria and can make a decision to embed or not, and may possibly make decisions about embedding relative to a predetermined perceptibility threshold. For instance, a decision to embed less than all candidates or embed in some logical pattern that can be later determined for detection or decoding operations. The magnitude sequencer may pick some even numbers of magnitudes of frequency components and modify them to match the current bit. Imagine a sequence of 6 magnitudes:

10.9 12.5 6.3 8.4 20.6 20.1

Calculating ratios between adjacent values yields the following ratios:

0.87 1.98 0.75 0.41 1.02

A bit may be determined by reading the number of ratios less than (or more than) 1.0. In this case, the count is 3 for the number of ratios less than 1 (namely, 0.87, 0.75, and 0.41), so the bit is determined by X mod 2, which, in this case, equals 1. The strength may be defined as the size of the ratio closest to 1 (namely, 1.02) minus 1 (in this case 0.02, or 1.02−1=0.02). This is the amount of change necessary to change the bit encoding. The embedder may have a minimum strength that it allows for a particular signal (e.g., 0.2).

This example can be modified to code either a 1 or a 0. To encode a 1, all strengths below the minimum strength are increased until they reach the minimum:

10.0 12.5 6.3 8.4 22.0 18.3 yielding the following ratios:

0.80 1.98 0.75 0.38 1.20 while maintaining the count of 3.

To encode this example as a 0, it is necessary to flip one of the ratios. Once again, the last 2 can be used:

10.0 12.5 6.3 8.4 18.0 22.5 yielding the following ratios:

0.80 1.98 0.75 0.46 0.80 which now gives a count of 4 and an encoding of 0.

The more frequency bands used, the more likely it is to have a minor modification available to create the correct encoding. However, the more frequency bands used, the more likely that an inadvertent or intentional frequency-modifying event (such as filtering) will affect the coding.

Decoder

The decoder may be described as repeating all of the stages of the embedder, except that instead of modifying the bands, it simply reads the current coding. To protect against false positives, it may be useful to reject windows whose minimum coding strength is below a threshold (e.g., 0.08). Detection may be separate from decoding or "reading the message pattern."

DETAILED DESCRIPTION OF THE INVENTION

Authentication of a digital signal may be handled by protocols that are intentionally perceptible but independently handled by checks of data that have been objectively presented for additional verification. Examples include digital signatures checks (e.g., where the ASCII text represents interpretable data for authentication in a verification step), data glyph checks (e.g., where some "randomly" but identifiable and perceptible data, including unique barcodes, can be authenticated), and perceptible unique identifiers (for instance, holographic stickers or materials not easily replicated). Differentiated from digital watermarks, these forms of authentication exist separately from the data to be protected. Such authentication does not necessarily impact the quality of the underlying information, as would an imperceptible digital watermark. The choice of imperceptibly or perceptibly tagging objects has a direct relationship with processing overhead. The computational difficulty of attacks on watermarks (as compared to attacks on digital signatures) relates to the watermark's imperceptibility as well as the difficulty in forging the watermarking key that was used to create the watermark. By enabling existing scanners, bar code readers, and other perceptible verification devices to additionally verify imperceptible data, security for any number of applications can be improved.

Devices that capture only the perceptibly represented data are not fool proof. Such perceptibly represented data may be forged. Enabling a logical relationship between an imperceptible channel of information and any perceptible identifiers enhances the difficulty in determining what elements of the subliminally embedded data and what features of the perceptible or supraliminally associated information are related. The perceptible information may simply increase the cover size of the data to be protected, meaning the candidate watermark bits can be more efficiently handled if both signal and perceptible identifier are both used to increase the amount of candidate watermark bit space. The inverse is true; for instance, if a Hamiltonian path between bits that are imperceptible and bits that are perceptible describes the path by which the data is to be verified. A digital signature similarly represents entropy which can be changed by the private key holder but is not obvious to the receiver of the information, the digital signature itself is "affixed" to the data but its value is not part of the document.

The ability to enable security of objects that may have value in physical media and electronic media also has clear economic benefits. In situations where economic benefits can be observed by the imperceptible nature of subliminal information, a number of situations exist where the perceptible information has a separate benefit. An example is where data is available for electronic and physical media distribution, and a perceptible mark and an imperceptible mark can be mutually dependent to offer security to both situations. At the same time, an additional affixed security measure, which is not "part" of the signal but is added on top, cannot help the object if it is encoded to some other media, for which the subliminally embedded information is still carried. If a document is digitally signed, no marking is evident. If it is watermarked, the signature is interwoven in the data in an imperceptible manner. If the methods disclosed herein are deployed, noise can be evident in the document but may represent only part of the authentication since imperceptible signature-like changes have also been made. The noise introduced, if removed, does not remove the imperceptible marks, but can be easily observed to indicate that the document has been "tagged". The ease of removing the perceptible tag, when a predetermined glyph or "mark", instead of noise, is obvious. The fact that the perceptible tag is not linear to the imperceptible mark, enables further difficulty in defeating the protocol, whereas the imperceptible information gains some more data space, theoretically, because the perceptible mark has no imperceptibility limits. To further boost the security of any given object combining an imperceptible watermark and perceptible signature-like functions has novel features absent in the prior art.

Digital watermarking algorithms may be optimized to generate a watermark or watermarks that are embedded in a given sample stream. Optimal watermarking can be done depending on the signal stream, images, audio, video and may be optimized for robustness, like an ROW ("robust open watermark"), or security, a forensic or fragile watermark. (See generally, U.S. patent application Ser. No. 09/594,719, entitled "Utilizing Data Reduction in Steganographic and Cryptographic Systems" (hereinafter, "Data Reduction"), as filed Jun. 16, 2000 (issued as U.S. Pat. No. 7,123,718 on Oct. 17, 2006), which application is incorporated by reference herein, in its entirety.) The limitation of absolute imperceptibility is removed once a supraliminal channel is utilized. This limitation acts as a roadblock to further increasing the robustness; if perceptibility for part but not all of the security is dependent on perceptible supraliminal information, better verification of the subliminal channel can be handled with the additional data payload afforded above a "predetermined perceptibility threshold." Utilization of watermark synchronization information or some other detection assistance (for example, statistical or stochastic assumptions about where a watermark is likely to be) may be used to increase the speed and performance of authentication. (See, e.g., the Drawings). Where authorization is dependent on the successful detection or decoding ("reading" or interpreting the actual watermark message) of any given embedded watermark, however, efficiency in detecting or decoding becomes a priority.

Design considerations may be altered in order to change the degree of robustness (the survivability of the watermark measured against signal degradation), security (the difficulty in removal or successful obscuring of the watermark), and perceptibility (the limitation of observable cover signal degradation). Visible uniqueness may also be achieved by altering design considerations. For instance, a perceptibly unique tagging mechanism is typically based on observable features of both intended recipients and third party observers, given consideration for ease-of-recognition. Uniquely identifying tags can be used in such a manner as to enable quick authentication checks that are nonobvious to casual observers (for instance, bar code-like or glyph-like information used for postage. An observer cannot read a glyph datum, but a computer or specialized detector can. At the same time, the existence of the datum indicates some functionality generally unknown or unreadable to casual observers, except that it affirms payment, such as with postage, or enables a device to evaluate the visible data.). Ideally, the unique tag should be difficult to reproduce (e.g., magnetic strips, difficult-to-copy color schemes, physically unique material in currency, or a holographic image). Last, physical identifiers must be sufficiently cost-effective to represent a fair cost and computational expense for the value of the item to be protected. There are both methods for changing some characteristic of a perceptible feature in a signal (luminescence or chromatics), or substituting data for separate identifiable data (an actual logo or tag). Changing a perceptible feature allows for a closer link between the identifying mark and the characteristics of the signal, and when ciphered can be made to act as a tamperproofing element of the signal. In either case, imperceptibility is not a consideration. Moreover, application of transfer function-based changes to subsets of the signal data enable randomly generated weighting of how the data is outputted. A cryptographically generated key may be associated with the data weighting, to enable noise like distortions to be introduced into the signal. (See generally U.S. patent application Ser. No. 09/046,627, entitled "Method for Combining Transfer Function with Predetermined Key Creation", filed Mar. 24, 1998 (issued as U.S. Pat. No. 6,598,162 on Jun. 23, 2003), which application is incorporated by reference herein, in its entirety).

Combining Subliminal Channels with Supraliminal Channels

The present invention, as a radical departure from the art, seeks to combine the benefits of steganographic ciphering with observable cryptographic protocols. Steganographic ciphering is limited by the channel signal's capacity for imperceptibly embedding data. Identifiable uniqueness lacks such a limitation. Given the breadth of perceptible identifier authentication devices, the security features of digital watermarks can be added to increase the overall security of given objects. The overall ease of implementation is often overlooked in the design of security architectures. The design of a security architecture must take into account the security applied, the value of the objects being protected, the cost associated with the security's renewability, and the difficulty of defeating the security. Measured in computational terms, security must be flexible enough to address new problems. Whereas cryptography represents mathematically provable measures of difficulty in discovering the secret key or keys, steganography serves to bridge cryptography with perceptibility of the watermarked signal. Asymmetric watermarking algorithms are available in systems where the embedding and detection of watermarks utilizes nonlinear relationships between how the signal was sampled and encoded. Certain signal processing schemes, including linear time invariant approaches, can provide adequate nonlinearity to enable public key watermarking schemes. Public key watermarking enables detection of the watermark but not access or detection of the watermark bits to preserve the integrity of the watermark. Hiding a watermark bit or bits in whitened noise or nondeterministic locations in a signal is discussed in U.S. patent application Ser. No. 09/456,319, entitled "Z-Transform Implementation of Digital Watermarks," filed Dec. 8, 1999 (issued as U.S. Pat. No. 6,853,726 on Feb. 8, 2005), which application is incorporated by reference herein, in its entirety.

Embodiments

A number of specific problems exist in the art where combining imperceptible embedding techniques with perceptible security protocols to enhance the security of any given object, including objects represented in physical media. Overall security can be increased in systems where both confusion and diffusion can be optimized. Confusion applies to the ability to hide relationships between the plaintext, ciphertext, and the key. Diffusion enables relationships between the plain text and key to be spread over the ciphertext. Because mathematical proofs rely heavily on credibility, the present invention seeks to leverage the benefits of steganographic ciphering in enabling successful subliminal channels with the notion of a supraliminal channel for handling limitations placed on the subliminal channel (by perceptibility, robustness, and security). The real limitation on the supraliminal channel is to enhance, not to obscure, the security of the data object. Similarly, in straight application of cryptographic protocols, cipher design is intended to make confusion and diffusion iteratively useful in reducing processing overhead. That is, to confuse the pirate by making encryptions look like entropy, or diffuse the encryption making the entire message more difficult to decrypt, or do both in an iterative fashion. If the application is primarily a visible mark type the visible mark is helped by the difficulty of discovering the imperceptible data or the way in which the bits are iteratively integrated into both perceptible and imperceptible domains—and cryptographically stored on a predetermined key. Alternatively, the opposite can be true to reduce the lack of imperceptible candidate bits alone in making a given signal unique.

The present invention likewise borrows the confusion of obfuscated data, from steganography, with the higher demands of cryptographic processing which are limited for application in a digital sample stream if intended only for a subliminal channel (the limit is the channel capacity in part based on a predetermined perceptibility threshold). The present invention also enhances security for objects that can be digitally and physically represented. Because we can observe entropy which is both perceptible and imperceptible, confusing the authentication data with entropy, or noise-like features, utilizing both subliminal and supraliminal channels, results in higher robustness results.

To properly combine the subliminal and supraliminal channel data, it may be desired to predetermine just how much overall data should be introduced or manipulated by the key. Similarly, a single digital signature or one way hash calculation may be propagated across the changes introduced by creating blocks of data, comprising subsets of the overall changes intended. Hashing a current block dependent on the hash of a subsequent block, enables such propagation. The hashing may be directed at those bits in the sample stream which are deemed to have higher perceptible significance or at a point where some data reduction has already been applied to the sample stream (see the Data Reduction application referenced above). The purpose is to enable subsequent detection of tampering of a particular portion of a signal; when applied after data reduction more valuable data, based on the reduction applied, will be hashed. Alternatively, hashes of each subset of data changes may be performed and saved to a detection or encoding key. That is, changes introduced by the encoder contemplated herein may be the basis for the uniqueness that is subsequently checked to enable verification. Separation between just what data subsets are hashed or signed for authentication, and what data needs to be further checked for verification offers a wide range of options to the encoder in enabling robust security features. Any dependencies between how perceptible and imperceptible data is handled can be effectively obscured to increase the complexity of brute force attacks. Further, because information complexity provides a limit of what information is represented in binary or digital terms, hashing data reduced portions of a signal or propagating such a hash throughout a signal is likely to secure the perceptibly significant portions of any given signal.

Unique Document Creation

Prior to distribution of a document, an imperceptible watermark consisting of at least one bit is uniquely generated for a plurality of copies. The embedding key may be maintained by the sender for security. Each of a plurality of intended recipients sends a public key, uniquely identifying each recipient, to further perceptibly mark the document based on the provided public keys. Alternatively, the public keys can be used to digitally sign the document. Ultimately, any number of relationships between the perceptible and imperceptible marks can be made to uniquely identify the documents. The digital signature, representing an affixed unique identifier based on any encryption performed on the plaintext is viewed as additional security. Should the document need to be authenticated or verified, a hierarchy representing the imperceptible and perceptible data can be ciphered so as to confuse potential attempts at tampering with the document. For predetermined documents (in the sense that any physical features are controlled by the sender), such as currency, postage stamps, travelers' checks, or the like can be estimated for any physical nonuniformities in the physical representation to assist in further representations of uniqueness for the physical documents. Unlike other technologies in the prior art, the present invention offers the benefit of digital watermarking as an imperceptible and perceptible application to address the inherent limits of computation of a subliminal channel alone. Additionally, the enhanced mapping based on the evaluation of a predetermined perceptibility threshold (for determinations of the difference between the subliminal and supraliminal channel) provides for higher robustness and resistance to brute force attacks on understanding the structure of the materials or logically ordered and mapped information being added to an object.

Improved Steganographic Ciphers

The improvement of the present invention relates to predetermining the available candidate bits for a steganographic ciphering process and then "sealing" the remaining bits. Most steganographic ciphering utilizes less than all available candidate bits to force attempts at removal to randomize a larger set of bits. A randomization attack operates by bit-flipping those bits which are believed to represent the predetermined watermark. Choosing a subset of the candidate bits increases the randomness of the actual bits manipulated. The choice to manipulate any remaining bits in the candidate subliminal channel bit stream serves as a means for sealing the entire digital watermark channel. (a watermark algorithm determines the candidate bits for watermarking and randomly changes a subset of the overall candidate bits, the remaining bits that are not chosen by the encoder can be determined and saved to differentiate the watermark bits from the additional bits that could have been watermarked in the candidate bit set of data). The further improvement of the present invention may utilize any supraliminal channel entropy or noise to enable logical relationships between imperceptible and perceptible noise for any given data object. Confusing authentication or verification bits with noise above and below a perceptibility threshold (the supraliminal and subliminal channels) removes some of the stricter limitations imposed by the imperceptibility requirements of steganographic cipher techniques, as described in the art. Moreover, enabling true subliminal free channels for digital objects requires an understanding of the overall available entropy in a document. Digital signatures hash the entropy in the document and save the hash to the private key so that the private key holder can determine if the document has been altered, usually a byte, 8 bits of data, must be changed for the signature check to fail. However, signature algorithms which are deemed subliminal free suffer from an incomplete information theoretic understanding both of the math which "proves" public key cryptography (there is no real proof only mathematically difficult problems such as factoring or Fermat's Theorem), and how much data relates the public and private key via the message being signed. Zero knowledge proofs address this partially by requiring some additional bit commitment by the sender to establish for the receiver that it was indeed he who signed the message, say by the alteration of a specific bit of a set of candidate entropy bits in the signal. Essentially separating "useful" information from information alone. However, since zero knowledge proofs are not related to measures of perceptibility, an for the purposes of the present invention such measures invariably matter to securing or making unique objects, by use of a steganographic cipher it can be determined, in advance, all candidate bits and enable additional related supraliminal bits to play a role in a predetermined change which suffices a zero knowledge proof.

Screening Technique for Caching or Archival Purposes

A visible watermark has application to screening in much the same way as robust open watermarks (ROW). (For a discussion of ROWs, see pending U.S. patent application Ser. No. 09/594,719, filed Jun. 16, 2000 (issued as U.S. Pat. No. 7,123,718 on Oct. 17, 2006), entitled "Utilizing Data Reduction in Steganographic and Cryptographic Systems" (which is a continuation-in-part of PCT application No. PCT/US00/06522, filed Mar. 14, 2000, which PCT application claimed priority to U.S. Provisional Application No. 60/125,990, filed Mar. 24, 1999), and PCT Application No. PCT/US00/21189, filed Aug. 4, 2000 (which claims priority to U.S. patent application Ser. No. 60/147,134, filed Aug. 4, 1999, and to U.S. patent application Ser. No. 60/213,489, filed Jun. 23, 2000 (issued as U.S. Pat. No. 7,475,246 on Jan. 6, 2009), both of which are entitled, "A Secure Personal Content Server"). The previously identified patents and/or patent applications are hereby incorporated by reference, in their entireties.)

While a visible watermark has traditionally been viewed as an ordered pattern which renders differences observable to 3rd parties for any particular media object, an ROW ("robust open watermark") is a fixed low cost imperceptible watermark designed to be robust against a number of signal manipulations (which can be predetermined as well). To boost the security of a visible watermark, ciphering of the mapped and observable changes made to a signal are made. Similarly, any imperceptible marks can be ciphered as well. By enabling a system to handle either perceptible marks (which need not be discovered by casual observers) or ROWs (which are informationally hidden in a manner consistent with the perceptibly significant features of a given data object), or both, screening can be made more robust. First, many data objects benefit from perceptible marks, including those objects that require quick visible authentication, such as traveler's checks and currency. The perceptible mark can be quickly checked since it is readily perceptible. Second, the perceptible marks may be made more random by application of a transfer function to scramble the signal changes enabling only the holder of a predetermined key the ability to observe the perceptible mark in an unfettered manner. Third, combinations of perceptible marks and ROWs are a low cost means for screening data objects which are sent and received by servers or caching applications for which data object-based tagging is desired (for legal reasons, efficiencies in grouping commercial and noncommercial objects consistently, etc.). The visible watermark, or manipulated supraliminal channel, may simply contain redundant enough information to be logically associated with the predetermined key (having both subliminal and supraliminal mapping and ciphering information), the predetermined message (which may exist in either the subliminal, or supraliminal channels, or both channels, and may be encrypted), and the object being protected (which may first be subject to some form of data reduction to measure the absolute minimum amount of data required to appropriately represent the object informationally or physically).

The present invention would increase the breadth of authentication and verification techniques that have a wider range of computational requirements to enable a wider range of commercial activity. With the addition of perceptible tags, the range increases beyond applications which focus strictly on imperceptible tagging (as most digital watermarking systems do). Consumers would have a simpler means for self-authentication of an object by observing a visible watermark and by supplying their public key to a server for which the watermarked object exists. The public key and signal characteristics of that data object sought could be further combined to assist in imperceptibly tagging the object with a forensic watermark (i.e., the characteristics of the object, the characteristics of the perceptible mark and the public key in combination can be used to generate an imperceptible mark). Alternatively, separation of the authentication of the visible or perceptible mark from the data object alone can be logically constrained for successful authentication or verification of the imperceptible tag to assure that data objects are handled in a manner consistent with the designs of the owner or creator of the data signal being offered. Providers of storage and archive space, and services which handle data which may be copyrighted or require security, benefit from the relationship between the perceptible and imperceptible tagging mechanism with the signal characteristics of the object. Unlike many disclosed systems in the prior art, too many systems rely strictly on access restriction protocols or security which has no relationship with the signal features of the data being protected.

While the invention has been particularly shown and described by the foregoing detailed description, it will be understood by those skilled in the art that various other changes in form and detail may be made without departing from the spirit and scope of the invention.

What is claimed is:

1. A computer-based method for securing a data signal having a signal containing bits that are suitable for manipulation and bits that are not suitable for manipulation, the method comprising:
    analyzing a plurality of candidate watermark bits to identify the bits that are suitable for bit manipulation;
    selecting a subset of the plurality of candidate watermark bits identified as suitable for manipulation;
    manipulating the subset of the plurality of candidate watermark bits; and
    associating the manipulated subset of the plurality of candidate watermark bits with the identified plurality of candidate watermark bits.

2. The method according to claim 1, wherein the subset of the plurality of the candidate watermark bits is identified using at least one of a psychoacoustic, psychovisual model, or perceptibility model.

3. The method according to claim 1, wherein the selected subset of said plurality of candidate watermark bits shares at least one bit with other subsets of candidate watermark bits.

4. The method according to claim 1, wherein any potentially selected subset of the plurality of candidate watermark bits share at least one bit with any other potentially selected subset of the plurality of candidate watermark bits.

5. The method according to claim 1, wherein the step of manipulating the at least one subset of the plurality of candidate watermark bits comprises at least one of the following group: hashing; signing; authenticating; verifying; and, requiring bit commitment.

6. The method of claim 1, wherein the step of associating the manipulated subset of the plurality of candidate watermark bits with the identified plurality of candidate watermark bits is a proof of bit commitment.

7. The method of claim 1, wherein the step of associating the manipulated subset of the plurality of candidate watermark bits with the identified plurality of candidate watermark bits is a proof of zero knowledge.

8. A computer-based method for securing a steganographically encoded data signal having a signal containing bits that are suitable for manipulation and bits that are not suitable for manipulation, the method comprising:
    analyzing a plurality of watermark bits in a steganographically encoded data signal to identify the bits that are suitable for bit manipulation;
    selecting at least one subset of the identified plurality of watermark bits identified as suitable for manipulation;
    manipulating at least one subset of the plurality of watermark bits; and
    associating the manipulated subset of the plurality of watermark bits with the original unencoded data signal.

9. The method according to claim 8, wherein the watermark bits are identified using at least one of a psychoacoustic model, psychovisual model, or perceptibility model.

10. The method according to claim 8, wherein any potential selected subset of the plurality of watermark bits may share at least a single bit with any another other potential selected subset of the plurality of watermark bits.

11. The method of claim 8, wherein the step of associating the manipulated subset of the plurality of watermark bits with the original unencoded data signal suffices a bit commitment proof.

12. The method of claim 8, wherein a predetermined perceptibility threshold is used to identify the plurality of watermark bits.

13. The method of claim 8, wherein the association between the manipulated subset of the plurality of watermark bits and the original unencoded data signal includes associations between at least a plurality of the group comprising: candidate bits; watermark bits; authentication bits; verification bits; bit commitments; entropy bits; supraliminal bits; and subliminal bits.

* * * * *

UNITED STATES PATENT AND TRADEMARK OFFICE
CERTIFICATE OF CORRECTION

| | | |
|---|---|---|
| PATENT NO. | : 8,271,795 B2 | |
| APPLICATION NO. | : 11/518806 | |
| DATED | : September 18, 2012 | |
| INVENTOR(S) | : Moskowitz | |

It is certified that error appears in the above-identified patent and that said Letters Patent is hereby corrected as shown below:

In the Claims:

Column 11 lines 39-43 change "5. The method according to claim 1, wherein the step of manipulating the at least one subset of the plurality of candidate watermark bits comprises at least one of the following group: hashing; signing; authenticating; verifying; and, requiring bit commitment." to -- 5. The method according to claim 1, wherein the step of manipulating the at least one subset of the plurality of candidate watermark bits comprises at least one of a group comprising: hashing; signing; authenticating; verifying; and, requiring bit commitment. --

Column 12 lines 20-21 change "associating the manipulated subset of the plurality of watermark bits with the original unencoded data signal." to -- associating the manipulated subset of the plurality of watermark bits with an original unencoded data signal. --

Column 12 line 39 change "tions between at least a plurality of the group comprising:" to -- tions between at least a plurality of a group comprising: --

Signed and Sealed this
Seventeenth Day of December, 2013

Margaret A. Focarino
*Commissioner for Patents of the United States Patent and Trademark Office*